US008468177B2

(12) United States Patent
Reeves et al.

(10) Patent No.: US 8,468,177 B2
(45) Date of Patent: Jun. 18, 2013

(54) CONTENT BASED APPROACH TO EXTENDING THE FORM AND FUNCTION OF A BUSINESS INTELLIGENCE SYSTEM

(75) Inventors: Christopher John Reeves, Tenerife (AU); Todd William Meynink, Bardon (AU)

(73) Assignee: Zap Holdings Limited, Teneriffe (AU)

( * ) Notice: Subject to any disclaimer, the term of this patent is extended or adjusted under 35 U.S.C. 154(b) by 0 days.

(21) Appl. No.: 13/498,427

(22) PCT Filed: Sep. 28, 2010

(86) PCT No.: PCT/AU2010/001267
§ 371 (c)(1),
(2), (4) Date: Mar. 27, 2012

(87) PCT Pub. No.: WO2011/038445
PCT Pub. Date: Apr. 7, 2011

(65) Prior Publication Data
US 2012/0185425 A1 Jul. 19, 2012

(30) Foreign Application Priority Data
Sep. 29, 2009 (AU) ................................ 2009904710

(51) Int. Cl.
*G06F 7/00* (2006.01)
*G06F 17/30* (2006.01)
(52) U.S. Cl.
USPC ........................................................ 707/802
(58) Field of Classification Search
USPC ........................................................ 707/802
See application file for complete search history.

(56) References Cited

U.S. PATENT DOCUMENTS 7,296,040 B2   11/2007   Cazemier et al.
7,457,810 B2   11/2008   Breining et al.
(Continued)

FOREIGN PATENT DOCUMENTS

EP       2056194 A1      5/2009
WO   WO-2008100371 A2   8/2008

*Primary Examiner* — Kuen Lu
(74) *Attorney, Agent, or Firm* — Novak Druce Connolly Bove + Quigg LLP

(57) ABSTRACT

A business intelligence (BI) system which includes the ability to extend its functionality outside of the project life cycle by means of specific content. Complex multidimensional queries are interpreted as trees of atomic sub-expressions that are combined in a parse-tree-like structure to form the overall query. Each sub tree is valid in isolation when provided with the proper context. Any sub tree can be an expression template, stored as application content, which at generation time uses simple text substitution with instance specific parameters to produce multidimensional expression syntax. The system includes a sophisticated type system and semantic layer that hides the user from the complexities inherent in working with OLAP databases. A business intelligence expert can provide type and semantic cues for each expression template, held as content. The content expression templates are then exposed in the application primarily through a context menu that is filtered for appropriateness, but also in an explorer tree, toolbars, menus and submenus. The functionality from a users perspective is integral to the application. An iterative processing capability to complement these expressions is provided by means of OLAP database stored procedures held as application content. Building on the above, workflow content allows business users to extend the application by creating expert-system-like guided analyses and processes. Of key significance to this innovation is the concept that the expression templates, stored procedures and workflows are application content, and therefore redistributable and unshackled from the classic software development lifecycle and the cost and expertise associated.

19 Claims, 26 Drawing Sheets

U.S. PATENT DOCUMENTS

| | | |
|---|---|---|
| 2006/0294087 A1 | 12/2006 | Mordvinov |
| 2007/0061291 A1 | 3/2007 | Azizi |
| 2007/0078823 A1 | 4/2007 | Ravindran et al. |
| 2007/0299860 A1 | 12/2007 | Westman et al. |
| 2008/0005689 A1 | 1/2008 | Evernden et al. |
| 2008/0201293 A1* | 8/2008 | Grosset et al. ............... 707/2 |
| 2008/0294596 A1 | 11/2008 | Xiong |
| 2009/0030915 A1 | 1/2009 | Winter et al. |
| 2010/0121868 A1* | 5/2010 | Biannic et al. ............. 707/759 |

* cited by examiner

| | |
|---|---|
| ⊞ Cap | $75,129.43 |
| ⊞ Gloves | $406,332.82 |
| ⊞ Jersey | $1,175,926.05 |
| ⊞ Shorts | $681,579.29 |
| ⊞ Socks | $47,741.66 |
| ⊞ Tights | $348,178.57 |
| ⊞ Vest | $433,514.50 |
| ⊞ Bottom Bracket | $86,377.29 |
| ⊞ Brakes | $110,227.50 |
| ⊞ Chain | $15,665.76 |
| ⊞ Crankset | $340,458.93 |
| ⊞ Derailleur | $117,256.75 |
| ⊞ Fork | $130,055.36 |
| ⊞ Handlebars | $297,478.73 |
| ⊞ Headset | $102,464.26 |
| ⊞ Mountain Frame | $10,298,121.22 |
| ⊞ Pedals | $246,019.79 |
| ⊞ Road Frame | $8,074,165.91 |
| ⊞ Saddle | $93,136.84 |
| ⊞ Touring Frame | $3,553,382.93 |
| ⊞ Wheel | $1,126,906.40 |
| ⊞ Freight | $11,347,291.61 |

FIG.6

| | Columns | |
|---|---|---|
| Rows | | Gross Amt |
| ⊞ Mountain Frame | | $10,298,121.22 |
| ⊞ Road Frame | | $8,074,165.91 |
| ⊞ Touring Frame | | $3,553,382.93 |

▽ Filters

Caption Contains Frame

FIG. 9

□ 🚪 Administrator
    ƒw ComputeElasticity
□ 🚪 System Content
    ⊞ 🚪 Current Period
    ⊞ 🚪 Date
    ⊞ 🚪 Dynamic Named Sets
    ⊞ 🚪 Misc
    □ 🚪 Moving Average
        ƒw Exponential Moving Average
        ƒw Simple Moving Average
        ƒw Weighted Moving Average
    ⊞ 🚪 Numeric
    ⊞ 🚪 Parameterised Reporting
  ƒw ComputeElasticity

| Key | Name | Field Type | Description |
|---|---|---|---|
| ☑ @Set | Set | Setlist | |

Add New Field  Delete Selected Field(s)

Key @FilterSet *

Name Set to Filter *

Description

Field Type Set ▷

Dimension Type

Save Field  Cancel

☐ Optional
☐ Suppress Template Field
☐ Visible When Defaulted

Conditional formatting | Heat Map

Filters

Columns | Location

| | ⊞ Europe | ⊞ Nth.America | ⊞ Pacific |
|---|---:|---:|---:|
| ⊞ Accessory ▽ | $182,247.29 | $1,438,066.96 | $77,511.13 |
| ⊞ Bike ▽ | $24,086,291.50 | $272,984,737.39 | $14,594,187.98 |
| ⊞ Clothing ▽ | $367,793.16 | $2,993,646.06 | $90,701.57 |
| ⊞ Component ▽ | $2,615,367.20 | $21,520,647.48 | $465,702.99 |
| ⊞ Freight ▽ | $1,418,342.99 | $9,681,505.73 | $247,442.89 |

(Rows) (Product)

FIG. 31

CONTENT BASED APPROACH TO EXTENDING THE FORM AND FUNCTION OF A BUSINESS INTELLIGENCE SYSTEM

PRIORITY

Priority is claimed as a national stage application, under 35 U.S.C. §371, to PCT/AU2010/001267, filed Sep. 28, 2010, which claims priority to Australian Application No. 2009904710, filed Sep. 29, 2009. The disclosures of the aforementioned priority applications are incorporated herein by reference in their entirety.

This invention relates to improvements in systems and methods of extracting business intelligence (BI) information from OLAP cubes and to an improved query generation program that is extended with specific content.

BACKGROUND TO THE INVENTION

The fundamental problem addressed by this invention is the rigidity constraining current business intelligence systems. Their initial development, complexity and maintenance overheads make for very expensive implementations, and daunting end-user experiences. They require a pipeline of specialist expertise in the business domain, data warehousing, and OLAP development arenas. Furthermore, any changes in requirements from end-users necessitate the involvement of many of these experts for a further duration.

Traditional BI implementations are bespoke development efforts that are purely service-based. The creations are typically unique to each business and are not reusable. This criticism is true of most B I systems that are currently available.

USA Patent specification 20070078823 is designed for application developers without business intelligence expertise, to provide black-box multidimensional expression generators for application development purposes. A business intelligence expert creates these reusable black-boxes that the developer can compile into their application. The expression generators are composable.

Recent patents generally address issues that are encountered in extracting data through queries. USA patent application 2008/0294596 deals with the conversion of a query that has combined hierarchical dimensions into data source specific queries by generating context expressions according to the hierarchy.

USA patent application 2008/0005689 provides a system that stores executable instructions to graphically display file object attributes of one or more file objects.

EP2056194 discloses executable instructions to receive a request for an action. A set of meta data is searched for meta data corresponding to the action and the search is limited by the action context.

U.S. Pat. No. 7,457,810 improves SQL queries by providing an XML wrapper that queries an XML document in an on-the-fly manner so that only parent nodes in the document that satisfy the query are extracted.

U.S. Pat. No. 7,296,040 discloses a method to automatically derive relationships between query subjects and query items to avoid double counting.

USA patent application 20090030915 discloses a method of determining a driving factor for a data value of interest by collecting a context for the data value of interest in the multidimensional database.

Reporting and summarizing data is only one aspect of analysis. Frequently, reports must be forward-looking, and meaningful forecasts are essential for effectively planning and running a modern organization. While there are powerful tools available to perform complex statistical analysis, they are generic in nature and require a fair degree of mathematical sophistication to operate. Combined with this, the operator must also possess a deep knowledge of the business domain to be effective.

One object of this invention is to address the need to make these powerful analytical tools available to business users. Another object is to provide a BI system that is affordable for smaller businesses and that reduces the reliance on experts.

BRIEF DESCRIPTION OF THE INVENTION

To this end the present invention provides A computer readable storage medium including executable instructions as part of a business intelligence query system which includes the capability to iteratively process data during execution
wherein
complex multidimensional queries are interpreted as trees of atomic sub-expressions that are combined in a parse-tree-like structure to form the overall query wherein each sub tree is valid in isolation when provided with the proper context;
wherein each sub tree is stored in the application content;
and some subtrees are expression templates and the type and semantic rules as applied to a single expression template, are held as content.

The type and semantic checks are preferably performed at design time and are not revalidated at generation time.

A context menu is preferably available for query parts which displays the applicable expression templates and employs a type system and semantic logic to filter available expression templates.

In another aspect the invention provides a computer readable storage medium including executable instructions as part of a business intelligence query system which includes the capability to iteratively process data during execution
wherein
complex multidimensional queries are interpreted as trees of atomic sub-expressions that are combined in a parse-tree-like structure to form the overall query wherein each sub tree is valid in isolation when provided with the proper context;
wherein each sub tree is stored in the application content;
and some subtrees are expression templates which at generation time uses simple text substitution with instance specific parameters to produce multidimensional expression syntax.

The content expression templates are preferably provided in a context menu, wherein the list of templates is filtered using a type system and semantic logic.

The system also preferably includes a drill through-on-calculated-members solution at the application level that allows the template designer to specify a substitutable drill through set expression.

Traditional OLAP query languages, being declarative, have not had the capability to iteratively process data during execution. The addition of stored procedures to an OLAP database has complemented and enriched their problem-solving capabilities. Preferably the type and semantic checks are performed at design time and are not revalidated at generation time.

The present invention takes a user-centric approach by providing the expression template functionality through content. Again, a business intelligence expert creates the template, but importantly it is stored as application content and immediately available to its creator and to other users. There is no generation step.

In order to implement expression templates as content, a few additional input fields are necessary. Two essential such fields are the default field and the parent hierarchy field.

Where the approach of application USA 20070078823 involves a meta-data generation step, the present invention utilises simple text substitution. While this approach would traditionally have been very error-prone, this is avoided by the overlay of a robust type system and a semantic layer.

Both approaches support composable expressions, but this is a natural result of the composable nature of multidimensional expressions, not the underlying inventions. The innovations presented here eliminate the need for specialist assistance beyond the initial implementation. They provide an infrastructure that simultaneously hides away the complexity of OLAP reporting, empowers the user to perform complex analyses, and delivers a dynamically extensible system that allows users to capture commonly used reporting constructs and reuse and administer them.

The content-centric approach demonstrated by this invention is significant in that it provides for redistributable logic, abstracted from the specifics of any particular OLAP cube. Furthermore, conventional application security can be used to customise the design experience. For example a security group "Designers 1" might be provided with a minimalist subset of a context menu available in full to the "Designers 2" group.

In a preferred embodiment of the invention, the end-user is exposed to these extensibility points:

A context menu available for query parts either in place, in the context of a query, or query parts being moved into place, in the context of a query. The context menu displays the expression templates applicable to the scenario. Very significantly, this content menu employs a type system to intelligently filter available expression templates, based on both the query part type and the placeholder type. The context menu also employs semantic logic to further filter the templates. The content, structure and detail of the menu is entirely derived from the expression templates held as application content.

Toolbars available per placeholder, in which the expression templates held as application content specify the toolbar to which they apply.

An expression template explorer, that is a non-context means of navigating all expression templates for which the active user has sufficient security permissions to view.

Menu and sub-menu points of extensibility, in which the expression templates held as application content specify the application menu and application sub-menu in which to display them.

The power user can extend functionality through:

Multidimensional expression templates as resources, which enable business intelligence experts to deliver redistributable expression logic.

OLAP database stored procedures as resources, which enable business intelligence experts to deliver redistributable iterative solutions as content.

Composite templates, which enable business users to combine expression templates from a library of content and compose new 'composite' expression templates.

Data-mining algorithms and workflow as content, which builds on the three resources above to provide a means of solving complex business problems.

A plug-in architecture is a common means of providing after-market customizability. Such an architecture relies on an application developer coding a computer program in its own right, to be hosted by the main application. This invention takes a different approach and instead allows extensions to be designed and saved inside the application as content. This patent envisages four resource types to be saved as content, that together provide the extensibility. The content approach has the following benefits:

Ease of creation—all extensions are created in one place: inside the application.

Ease of maintenance—all extensions are stored in one place: inside the application. Basic application security can control access to them. The same basic application security can be used to personalize the interface, by restricting the extension exposed for usability purposes.

Ease of distribution—content can be exported to a file and distributed by conventional means, for example, email.

It is intended that the reader should interpret all of this discussion within the context of a content-based approach to extending a business intelligence application.

The novel introduction of a middle-tier to report against introduces a layer of abstraction that allows reports and metrics to be developed once and reused, even on different databases.

It is worth emphasizing that not only is reporting content reusable, but reporting functions (for example, calculating gross profit margin or average stock turnover) can be developed once and reused repeatedly.

This reusability empowers existing BI service-based businesses to deliver product offerings that capture the value of their industry knowledge and help them scale their businesses. Where BI systems were once difficult to modify and extend, the content-driven extensibility of this invention means any deployment can be extended dynamically by the end-user.

Most query languages are declarative in nature, and so cannot easily perform iterative operations on data during the querying process. Database stored procedures can provide the iterative complement to query languages. Many tasks are slow or impossible without the combination of these two language paradigms. The present invention provides a content-driven approach to seamlessly draw these two methodologies together and instantly deliver more power to the end-user.

Data Types

Most programming languages include a notion of type for expressions and/or objects. Types serve two principal purposes:

1. Types provide implicit context for many operations, so the user does not have to specify that context explicitly. In MDX, for example, the expression a+b will use floating point addition if a and b are of Double type; it will use set addition (union) if a and b are of type set.

2. Types limit the set of operations that may be performed in a semantically valid program. They prevent a programmer from multiplying a character and a record, for example, or taking the arctangent of a set, or passing a file as a parameter to a subroutine that expects an integer. While no type system can promise to catch every nonsensical operation that a programmer might put into a program by mistake, good type systems catch enough mistakes to be highly valuable in practice.

Type System

At its most basic level, computer hardware processes a stream of 1's and 0's. The various units inside a processor may interpret bits as, among other things, instructions, addresses, characters and integer and floating-point numbers of various lengths. The bits themselves, however, are untyped; the hardware on most machines makes no attempt to keep track of which interpretations correspond to which locations in memory. Assembly languages reflect this lack of typing: operations of any kind can be applied to values in arbitrary locations. High-level languages, on the other hand, almost always associate types with values, to provide the contextual information and, error-checking just mentioned.

Informally, a type system consists of:
A mechanism to define types and associate them with certain language constructs; the constructs that must have types are precisely those that have values, or that can refer to objects that have values.
A set of rules for:
Type equivalence (when the types of two values are the same).
Type compatibility (determines when a value of a given type can be used in a given context).
Type inference (defines the type of an expression based on the types of its constituent parts or (sometimes) on the surrounding context).

Type Checking

Type checking is the process of ensuring that a program obeys the language's type compatibility rules. A language is said to be strongly typed if it prohibits, using the ways that the language implementation can enforce, the application of any operation to any object that is not intended to support that operation. A language is said to be statically typed if it is strongly typed and type checking can be performed at compile time.

Definition of Types

A type is an interface consisting of a set of operations with well-defined and mutually consistent semantics.

Classification of Types

Frequently programming languages support two kinds of types: reference types and value types. Simpler constructs such as a single integer are typically treated as value types—they have no identity themselves and their value contains all the important information about them. They are fungible: one integer 7 is equivalent to any other integer 7. Reference types on the other hand refer to a particular instance of a type (usually a more complex type such as an object or set). Each reference points to a unique instance of a type.

Boxing and Un-Boxing Value Types

Often, some constructs expect a reference type as a parameter for certain operations.

It is possible to convert a value type to a reference type by using a mechanism called boxing. The value type is encapsulated in a wrapper object and a reference to it returned.

Definitions

Business Intelligence (BI)
A method to improve business decision making by presenting information in a way that guides action towards desired goals.

Recursive (Composable) Type
A recursive type is one whose objects may contain one or more references to other objects of the same type. Most recursive types are records, since they need to contain something in addition to the reference, implying the existence of heterogeneous fields. Recursive types are used to build a wide variety of "linked" data structures including lists and trees.

Pointers
Pointers (also known as reference types) are a special kind of variable that holds a memory address. Typically, this is the address of another scalar variable or an array, but may also contain the address of a function.

Compiler
A compiler is a piece of software that takes code written in a high level language and translates it into another, typically lower level, language. One example in common use today is Microsoft's C# compiler, which takes code written in the high-level C# language and converts it into Microsoft Intermediate Language (MSIL) instructions. When this software is executed, Microsoft's Common Language Runtime (CLR), part of the .NET framework, in turn compiles these MSIL instructions into a low level assembly language that Intel processors can interpret.

Composable
The ability to nest one element inside another.

Content
More fully, application content—this is, quite literally, the content of an application. For example, a word processing document can be considered the content of the word processing software. A pivotal concept to this invention, content is usually easy to create and easy to disseminate by electronic means.

Cross-Join/Cross Multiply
A set which is the product of two sets, such that each member of the first set, is combined with each member of the second. For example, (January, February) cross-joined with (car, bike) would return (January car, January bike, February car, February bike).

Cube
A multi-dimensional database optimized for fast retrieval and aggregation of data.

Drill-Through
Drill-through enables a client application to access the lowest level data that aggregates to the cell (or cells) of interest.

DSV
Data Source View—a view of the base system data which maps more naturally to its definition in the cube than the raw data ERP
Enterprise Resource Planning is an industry term for the broad set of activities supported by multi-module application software that helps a manufacturer or other business manage the important parts of its business, including product planning, parts purchasing, and maintaining inventories.

Extensibility
The ability to be extended.
KPI—Key Performance Indicator—a metric used to monitor and measure a business statistic against a benchmark.
MDX—Multi-dimensional Expressions: MDX is the leading query language for multi-dimensional databases. MDX was created to query OLAP databases, and has become widely adopted with the realm of OLAP applications.
OLAP—OnLine Analytical Processing systems enable executives to gain insight into data by providing fast, interactive access to a variety of possible views of information.

The following definitions introduce concepts that reflect the multidimensional view and are basic to OLAP.

A "dimension" is a structure that categorizes data. For example, Customer, Product, and Time. Typically, a dimension contains one or more hierarchies. Several distinct dimensions, combined with measures, enable end-users to answer business questions. For example, a Time dimension that categorizes data by month helps to answer the question: "Did we sell more widgets in January or June?"

Numeric data is central to analysis, but how it is handled in the invention is dependent on its scale of measurement. There are usually four scales of measurement that must be considered:
Nominal
Ordinal
Interval
Ratio A "measure" includes data, usually numeric and on a ratio scale, that can be examined and analysed. Typically, one or more dimensions categorize a given measure, and it is described as "dimensioned by" them.

A "hierarchy" is a logical structure that uses ordered levels as a means of organizing dimension members in parent-child-relationships. Typically, end-users can expand or collapse the hierarchy by drilling down or up on its levels.

A "level" is a position in a hierarchy. For example, a time dimension might have a hierarchy that represents data at the day, month, quarter and year levels.

An "attribute" is a descriptive characteristic of the elements of a dimension that an end-user can specify to select data. For example, end-users might choose products using a gender attribute. This would result in the aggregate of all matching gender data. Some attributes can represent keys or relationships into other tables.

A "query" is a specification for obtaining a particular set of data from a larger set, which is referred to as the query's result set. The specification requires selecting, aggregating, calculating or otherwise manipulating data. If such manipulation is required, it is an intrinsic part of the query.

Placeholder Field

A user interface element, common to OLAP client tools, that allows a user to drop other elements on it in order to compose an object, for example a set or tuple. A placeholder can contain tabs and these map to query parts, so for example, a Row placeholder could have a 'January' tab and 'Aggregate of Bike and Car' tab.

Query Block or Query Part

A component of the query tree, possibly an expression template instance, for example Aggregate of January and February, but not necessarily so, for example a Measure. Query parts roughly map 1 to 1 with OLAP cube objects, for example member to member, set to set, although expression templates break this mapping.

Resource

A generic term for a BI reporting element, for example a KPI, scorecard or analytical report, or a component thereof, for example a named set or calculated member. Content is composed of resources.

Templating

Providing a skeletal logic structure into which instance specifics can be placed. The term need not be specific to expression templates, but within the contents of this document it should be considered so. For example, a trivial expression might be Sum(@Set) where the @Set marker will be replaced at a later point with a specific instance value.

User Interface

The means by which users interact (Or interface) with application software.

Write-Back

It is possible to physically modify a cube through a write-back operation. If a dimension has write-back enablement, one can create, delete and move members within a hierarchy or update custom member formulas and properties. One can also update data cells within the cube.

DETAILED DESCRIPTION OF THE INVENTION

The invention will be described in more detail with reference to the drawings.

FIGS. 6 to 13 illustrate a worked example using the method of this invention;

Figures 22, 23:
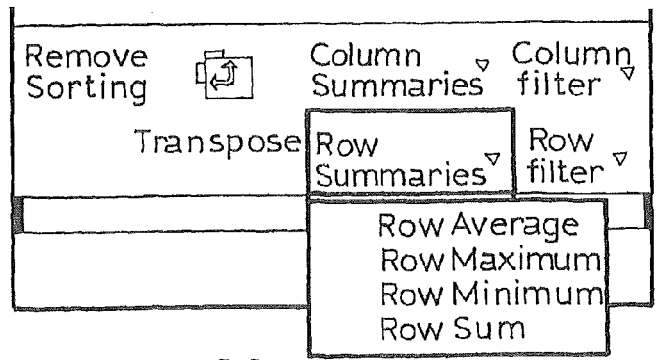
Figure 24:
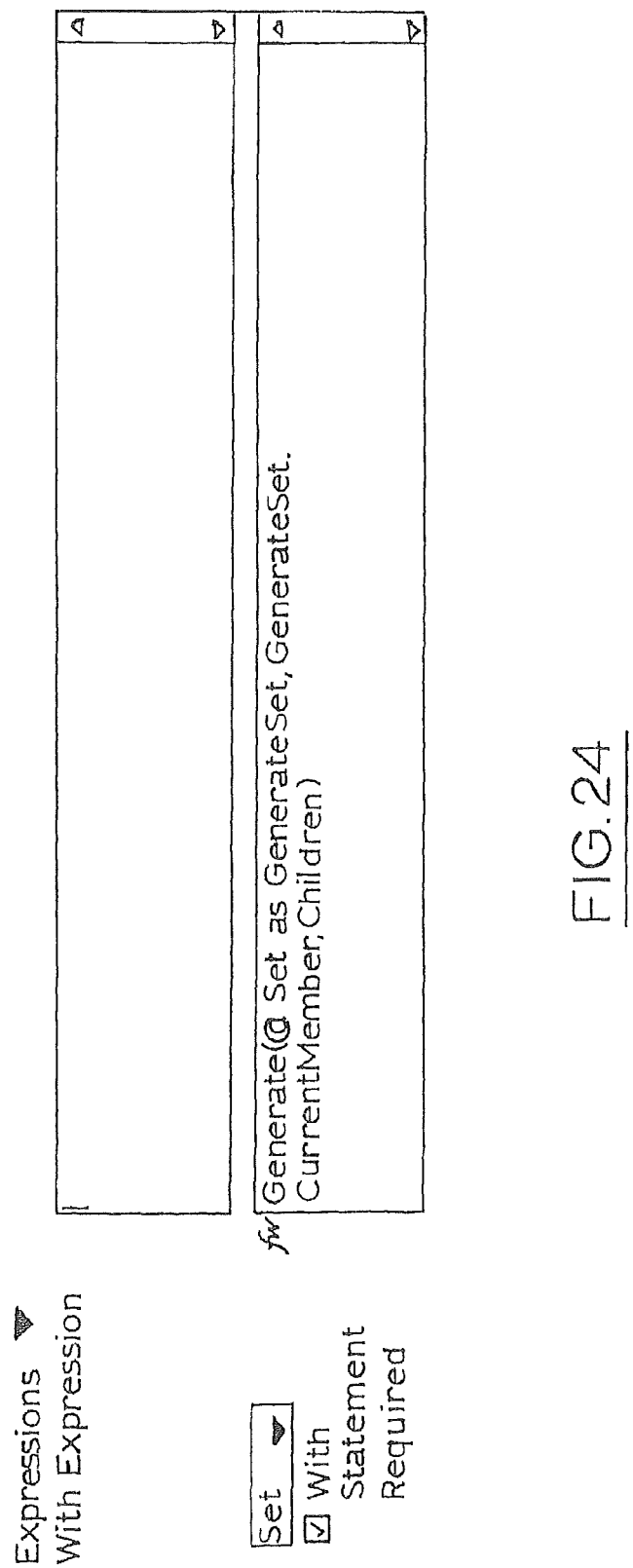
Figure 26:
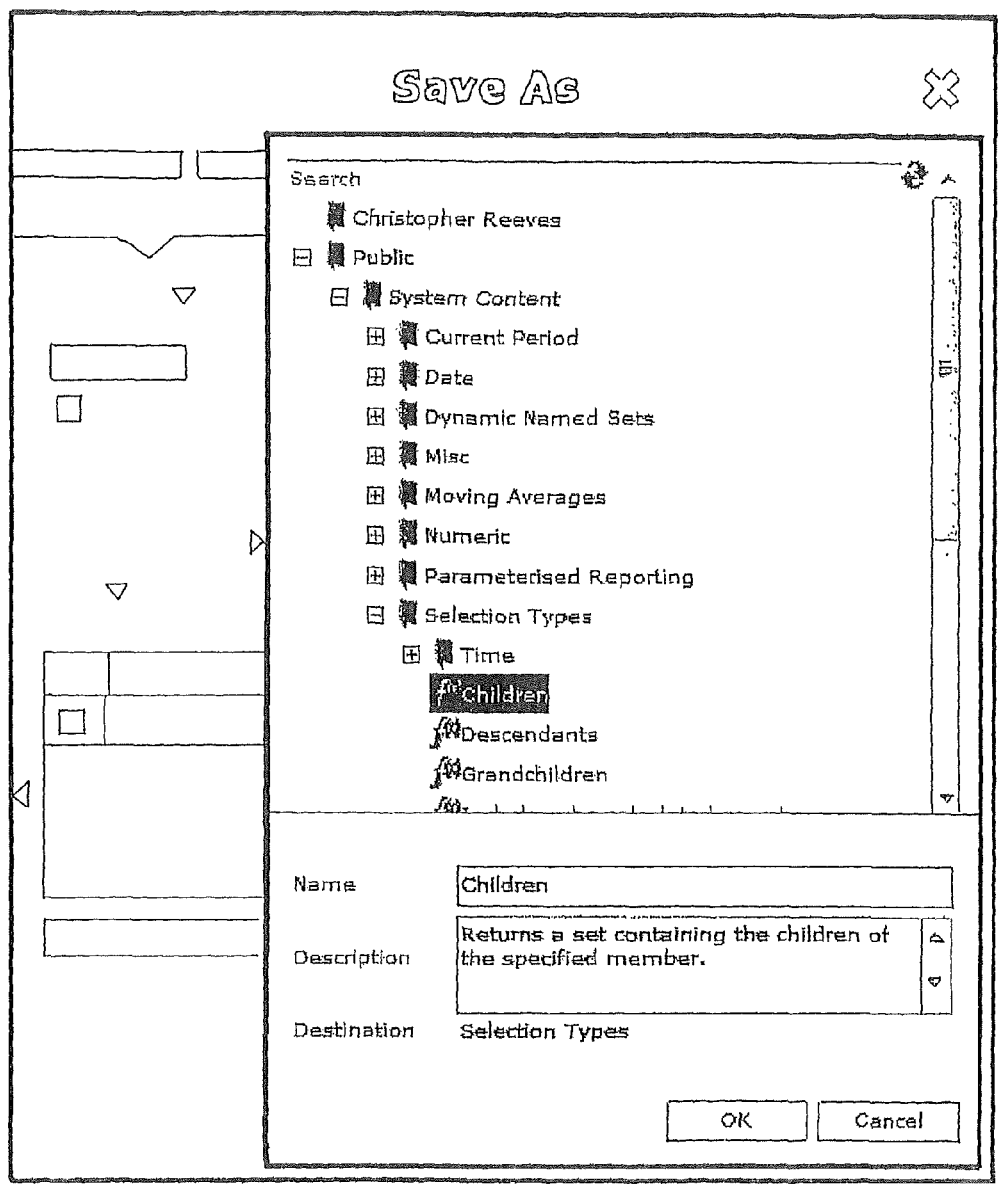
Figure 29:
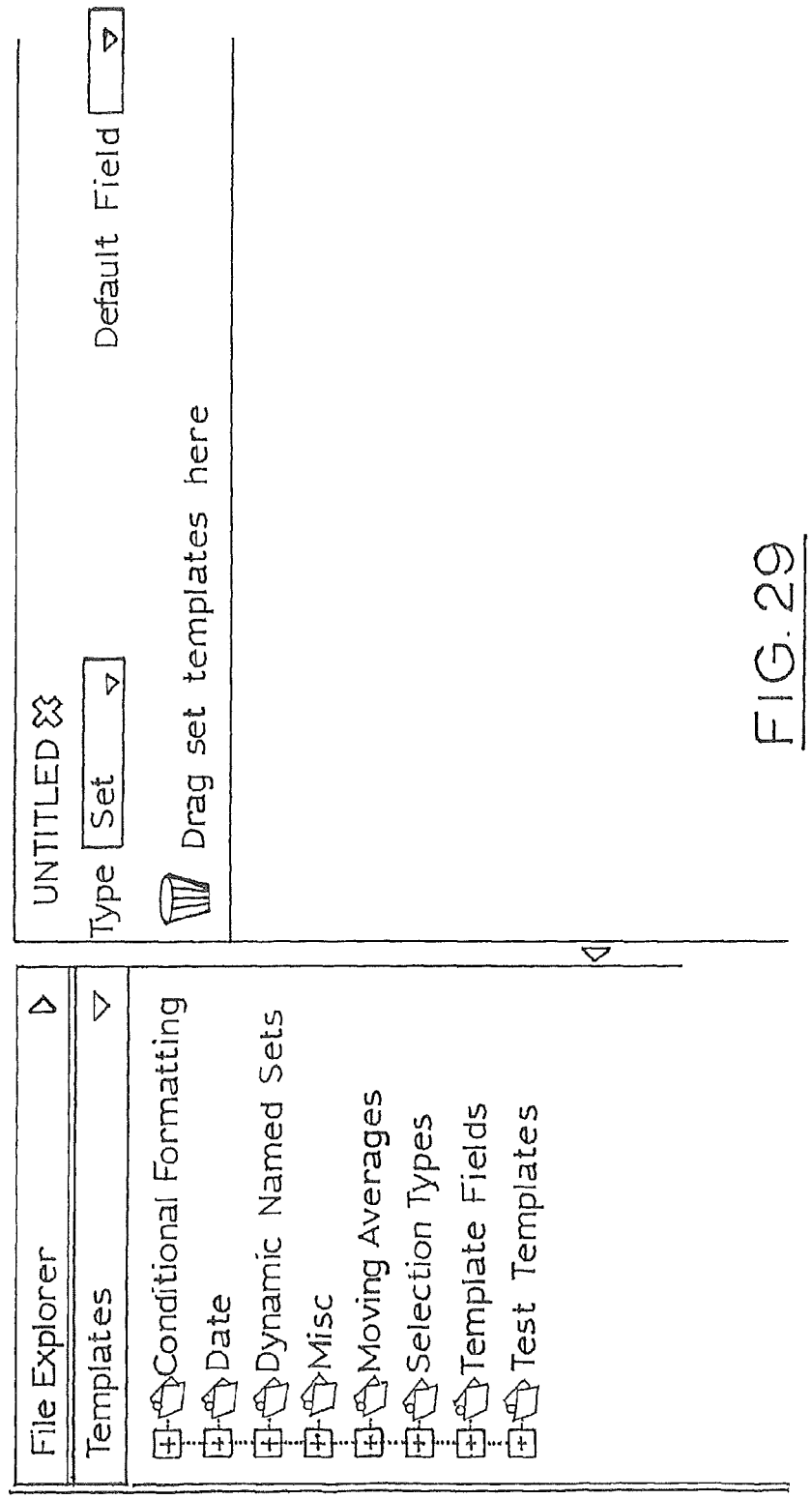
Figure 30:
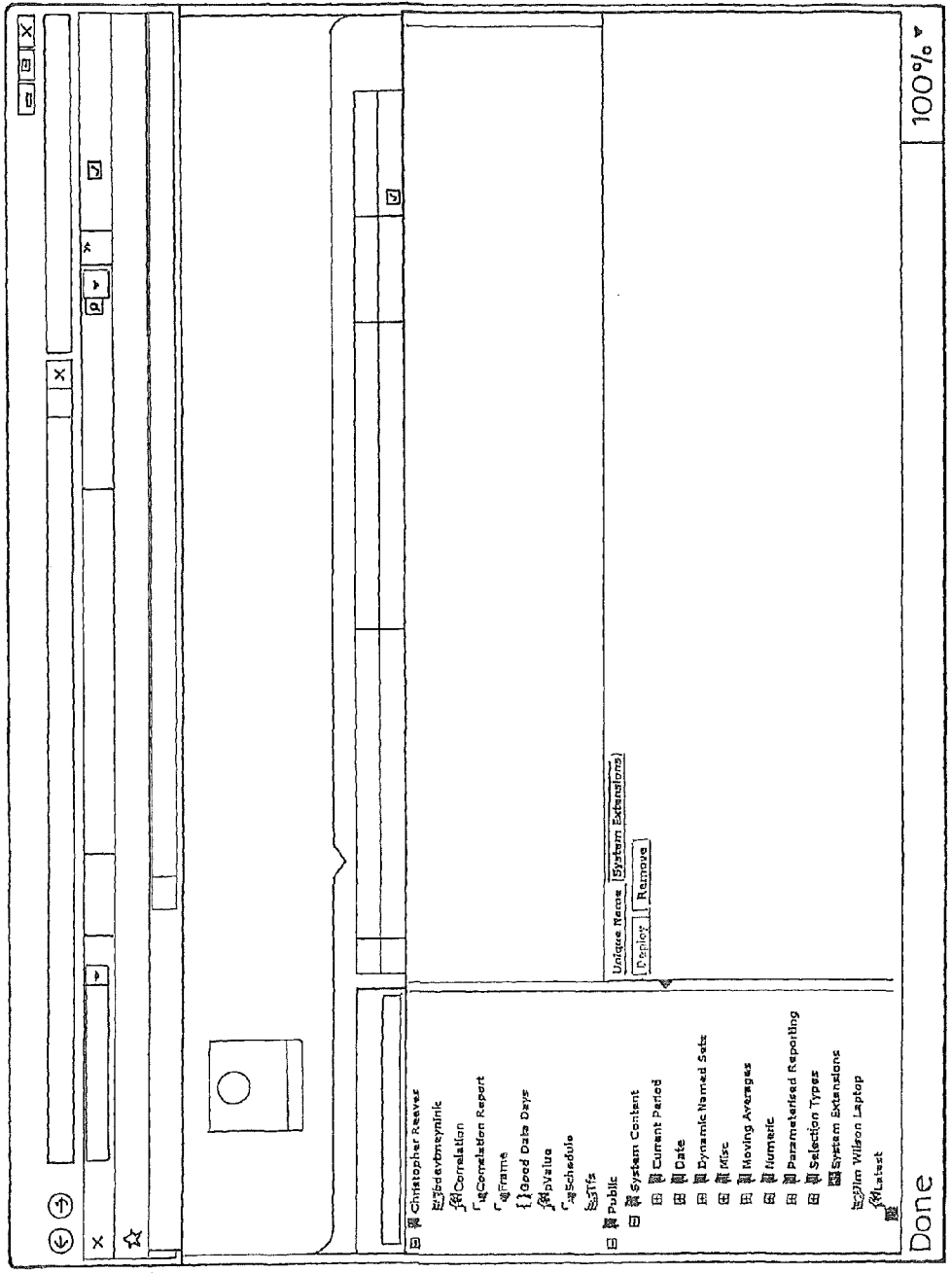
Figure 32:
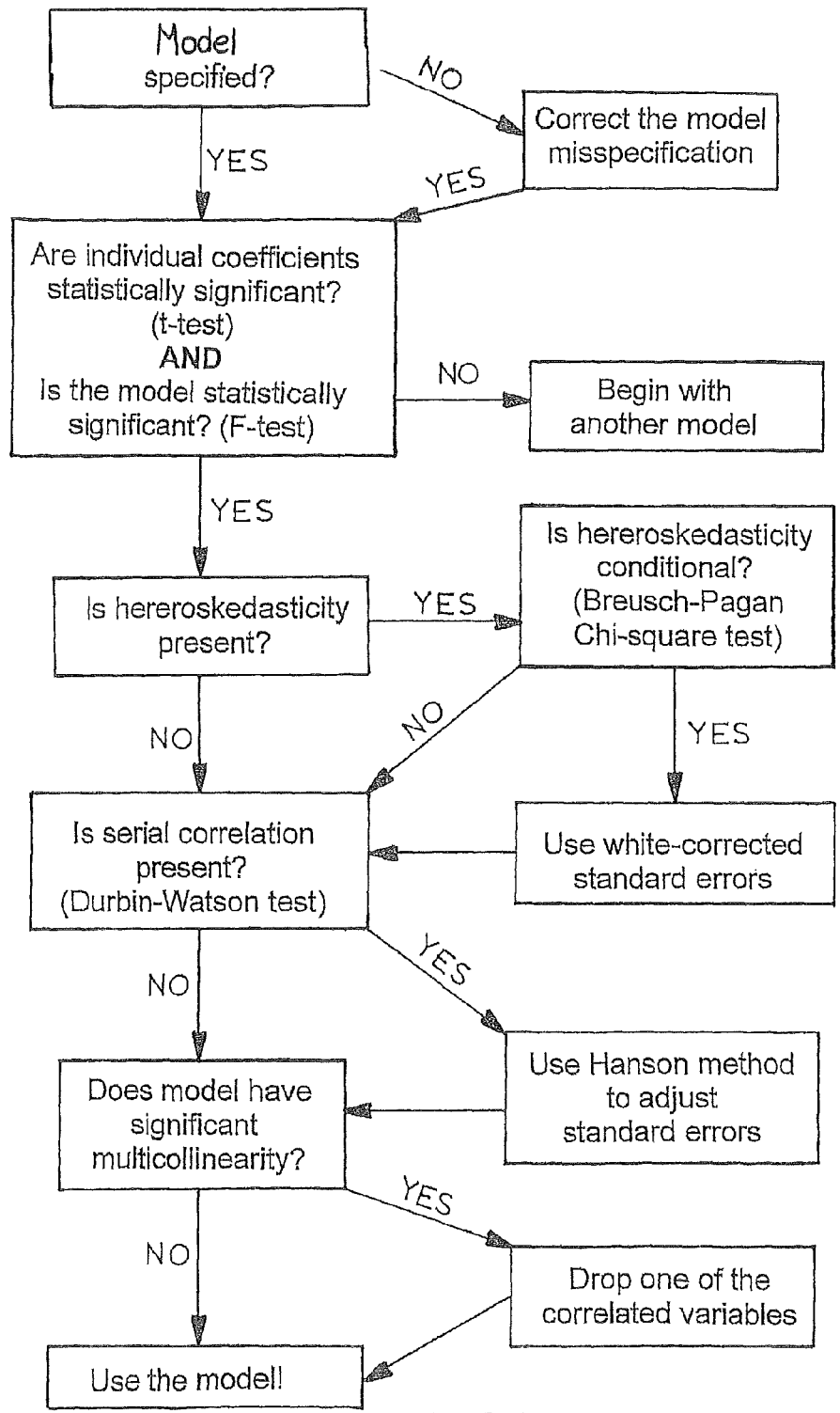
Figure 33:
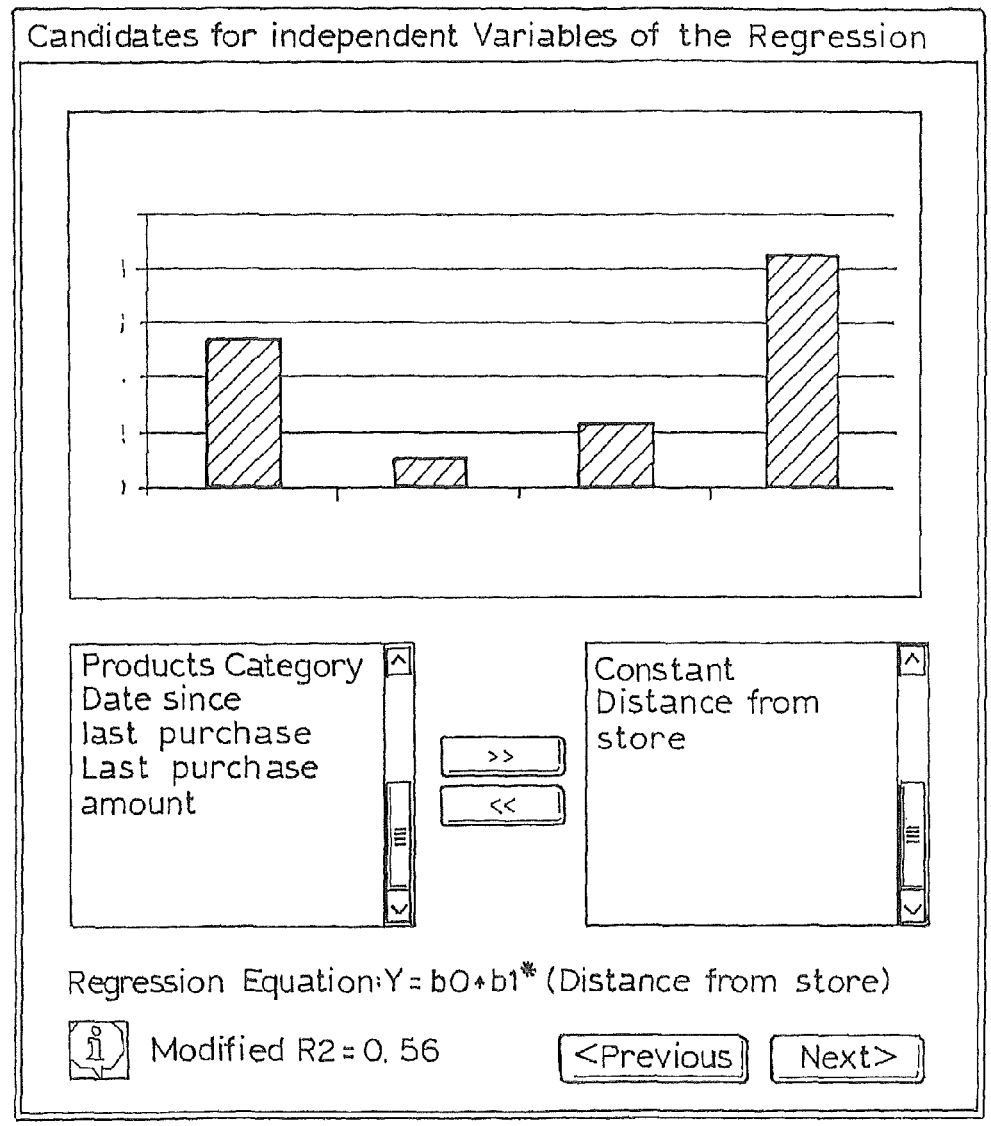

FIG. 22 demonstrates templates available in the application ribbon for the purpose of table summaries according to one embodiment of this invention;

FIG. 23 illustrates the use of union operation in presenting dimensionality according to one embodiment of this invention;

FIG. 24 illustrates the use of substitution fields in an expression template according to one embodiment of this invention;

FIG. 25 illustrates the inclusion of a dropdown, of current value Set in an expression template of FIG. 24 according to one embodiment of this invention;

FIG. 26 provides an example Save As popup for the template resource according to one embodiment of this invention;

Figures 27, 28:
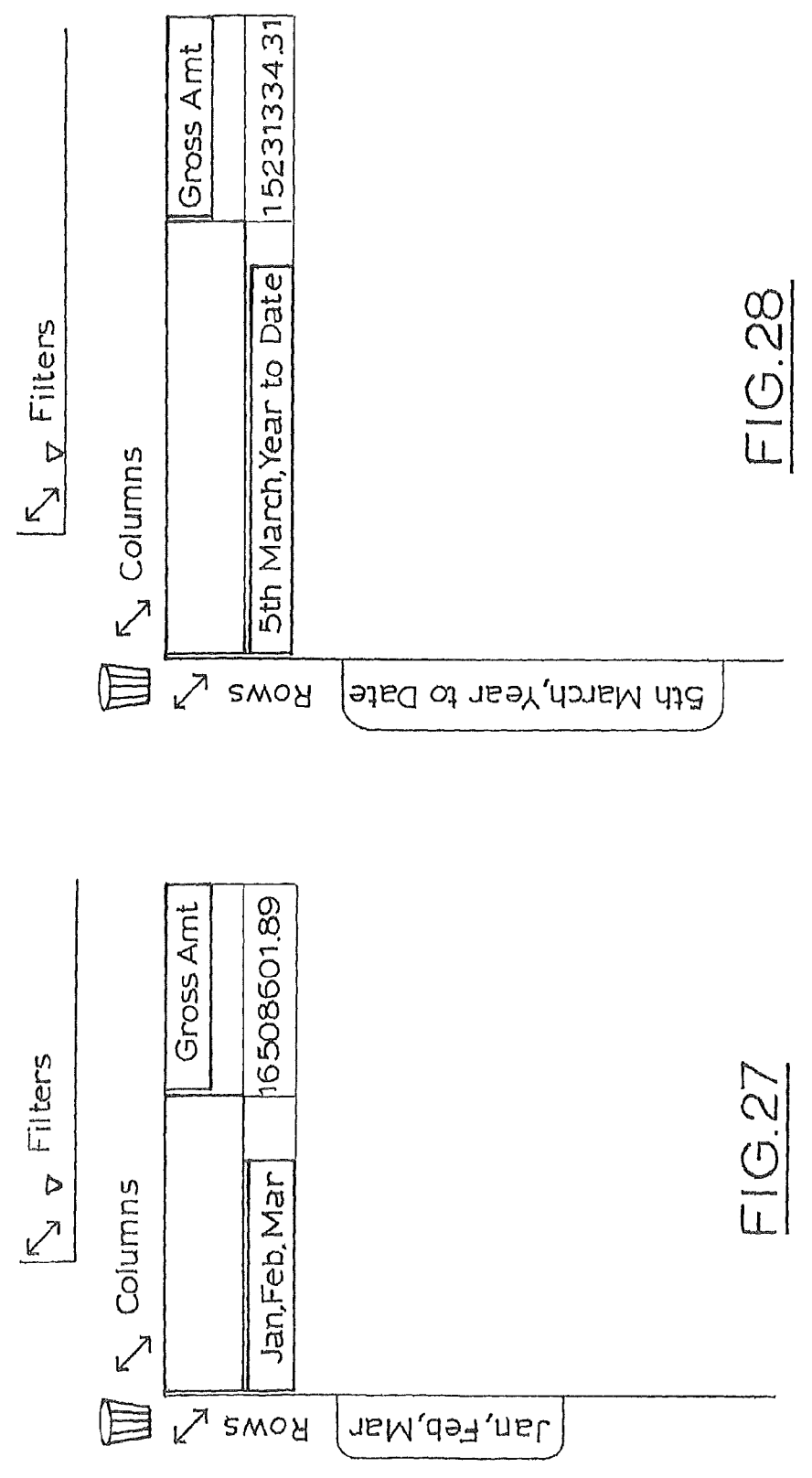

FIG. 27 shows a simple analysis in which January, February and March have been aggregated into the calculated member according to one embodiment of this invention;

FIG. 28 demonstrates a the calculated member on Rows as an aggregate for all Date members according to one embodiment of this invention;

FIG. 29 shows a possible design experience for a composite template according to one embodiment of this invention;

FIG. 30 depicts one embodiment of the design experience for stored procedures within an application stored as resources;

FIG. 31 shows a calculation template instance to create a heat map from an analysis according to one embodiment of this invention;

FIG. 32 is an example of a workflow that could be created to test the assumptions involved in the method of this invention;

FIG. 33 illustrates the amount of information each candidate variable provides, presented visually as a bar chart.

Figure 34:
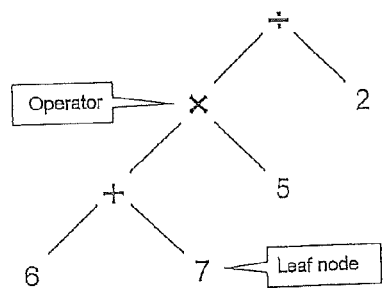

FIG. 34 is an exemplary abstract syntax tree; and

Figure 35:
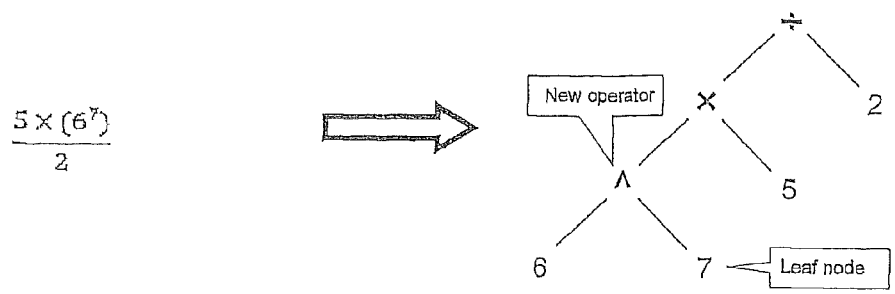

FIG. 35 is another exemplary abstract syntax tree.

Figure 1:
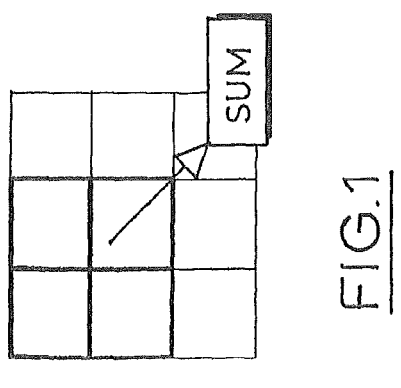
Figure 5:
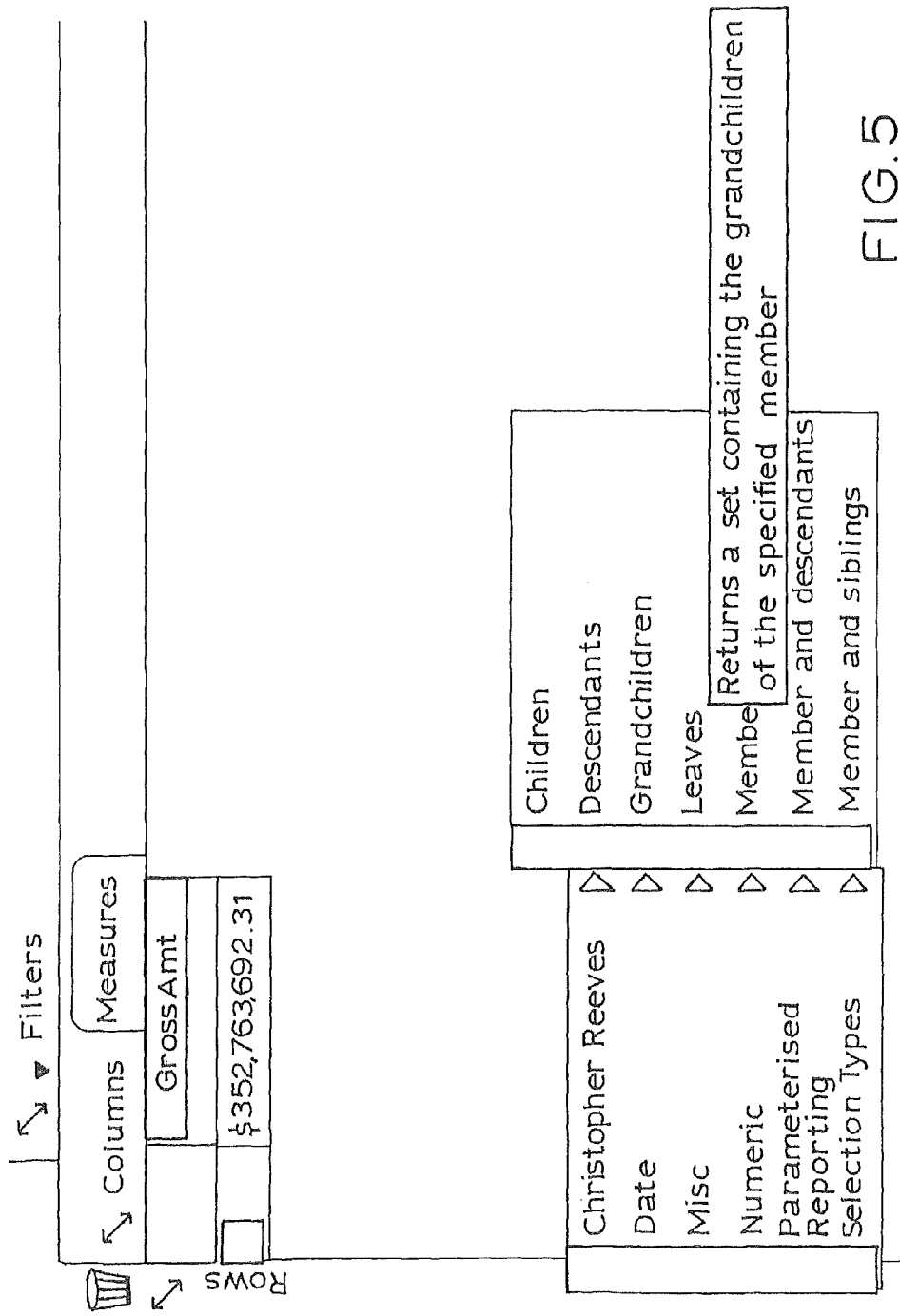

Error! Reference source not found. FIG. 1 demonstrates a user attempting to drag a block of four cells into a single cell. Sensibly, four cells cannot be placed into a single one without first performing an operation, for example summing them. FIG. 5 also shows a context menu providing this operation.

This most important concept in this invention is that this context menu and its logical equivalents are not static, but rather editable by application users. The current practice in business intelligence software is that a developer programs such menus to include specified operations and logic, i.e. a static solution. This approach is stymied by the number of experts required (domain expert, business analytics, developer) and slow product lifecycles.

Figure 2:
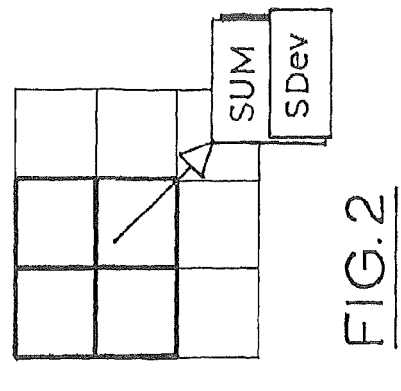
FIGS. 1-5 illustrate the basic steps in the query tree of this invention.

The invention described here enables business intelligence experts to directly add options to this menu and its logical equivalents. FIG. 2 shows a new option, SDev, that the BI expert was able to create as content, using an in-application designer. Content implies that the extension is an item within the application, as fruit can be placed in a cardboard box, another example: a word processing document within a word processing application. This approach cuts out two experts and avoids the delays inherent in the product lifecycle.

Figure 3:
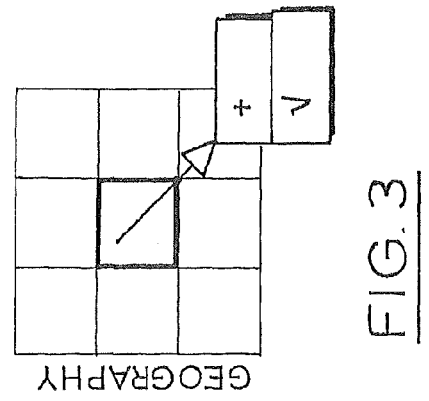

FIG. 3 demonstrates the user attempting to drag a single cell into another single cell. Assume that geographical information is maintained in the rows (for example the first row might contain 3 cells for Australian data). The options available have changed from FIG. 2. While a block (set) of cells can be summed, it does not make sense to sum a single piece of data. This demonstrates that the context menu is 'type' aware. The invention described here allows the BI expert to provide information to the system in the same content that defines the operation (for example Sum, +). Current BI software development practice requires such checks to be statically described and enforced.

Figure 4:
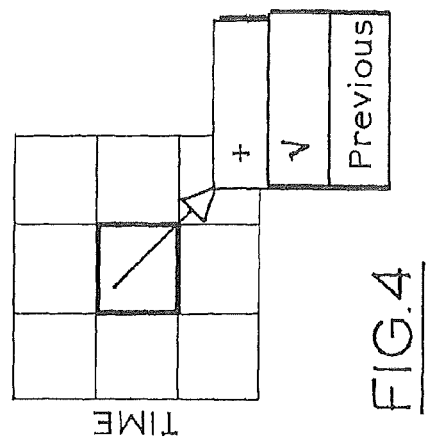

FIG. 4 demonstrates the same action as FIG. 3, however we will now assume that time information is maintained in the rows. The context menu from FIG. 4 now includes the additional option, Previous, which for this example takes the previous time period data. For example, if the cell in question (the middle cell), takes 2009 as its time context from the row it is in, the Previous operation will return the equivalent data for 2008. Importantly, this option was not available in the scenario described by FIG. 3. The semantics of geography imply that "previous geography member" has no meaning, even though it is technically achievable. The invention described here allows the BI expert to describe these semantics to the system in the same content that defines the operation (for example 'Previous'). Current BI software development practice is to statically enforce a limited and prescribed subset of such logic.

Worked Example

For the purposes of demonstrating the core components of the invention, a worked example will now be provided. The problem statement is: to provide an analysis grid, with the aggregate of all wheel sales and frame sales in rows. The hypothetical OLAP cube does not currently have a frame member, but rather multiple frame members as can be seen in FIG. 6.

It is worth noting that such an extensible BI application, as envisaged, allows for multiple ways of skinning this cat and the following is just one such approach. The first step is to define an analysis with the default measure on Columns and then make use of a reference template (described in detail later) to obtain all the grandchildren of the Product dimension's default member. FIG. 6 shows the context menu available on the member. This is an extremely important component of the invention. The context menu is filtered based on the type system and semantic logic provided by the expression template designer. For example the designer may specify a dimension type, for which the operation has meaning.

FIG. 6 shows the result of applying the reference template.

Figure 7:
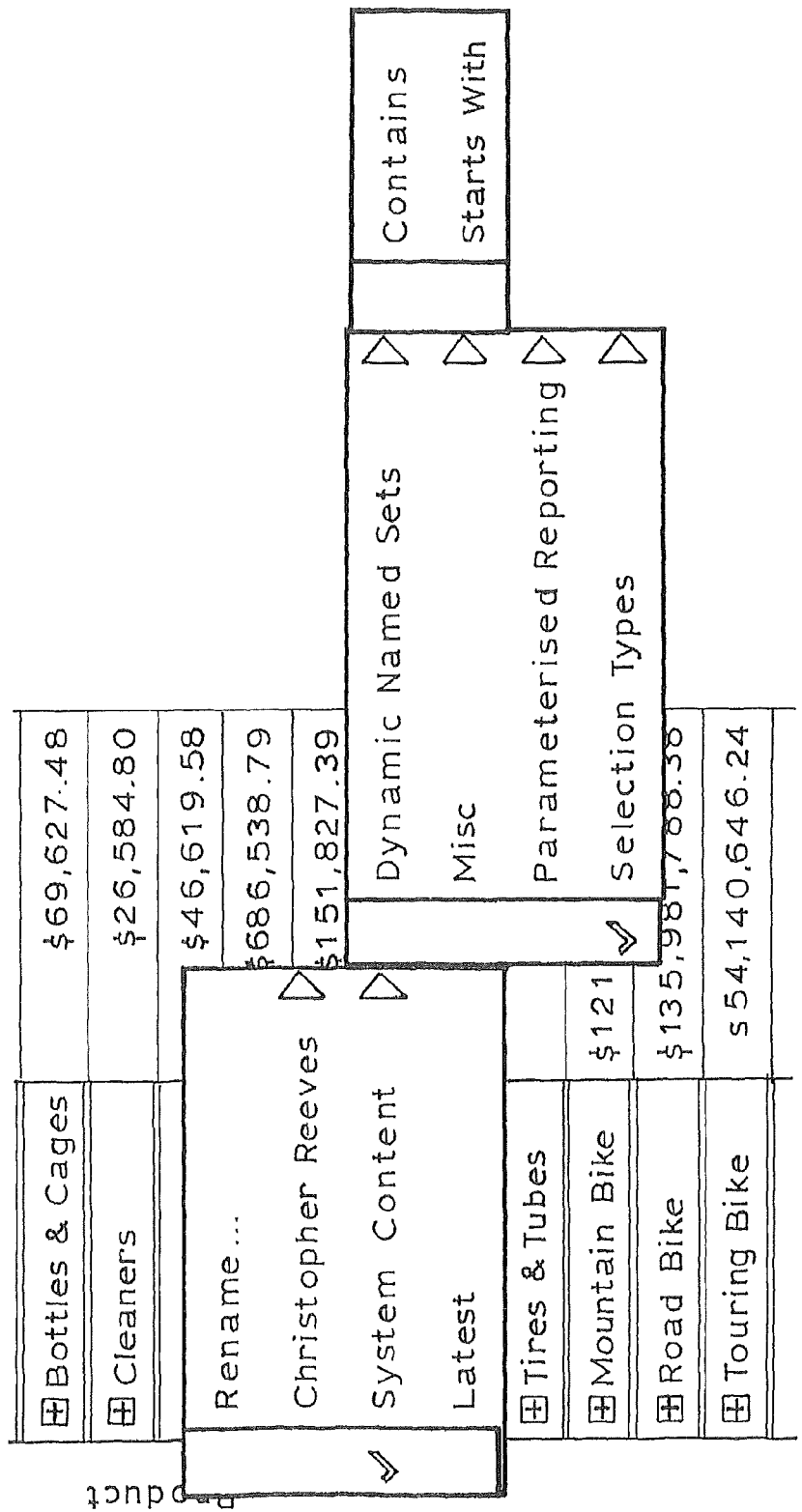

The next step is to filter the grandchildren to those that contain "Frame" within their caption. FIG. 7 shows the context menu applied for the set of Product grandchildren. The templates available are those that operate on a set and return an object that is valid for the axis.

The user selects the Contains template and the result is the automatically-generated form as shown in its populated state in FIG. 7. Of note is that the query part that provided the context for the menu, i.e. Product's grandchildren, is now in the default field (in this case the only query part field) of the form (circled in FIG. 6). The type of the default field is one side of the type system filtering equation; the other is the context, for example, the fact that the query part is associated with the rows placeholder means it requires a set as output. This is explained in detail in the following technical discussion in this document.

Figure 8:
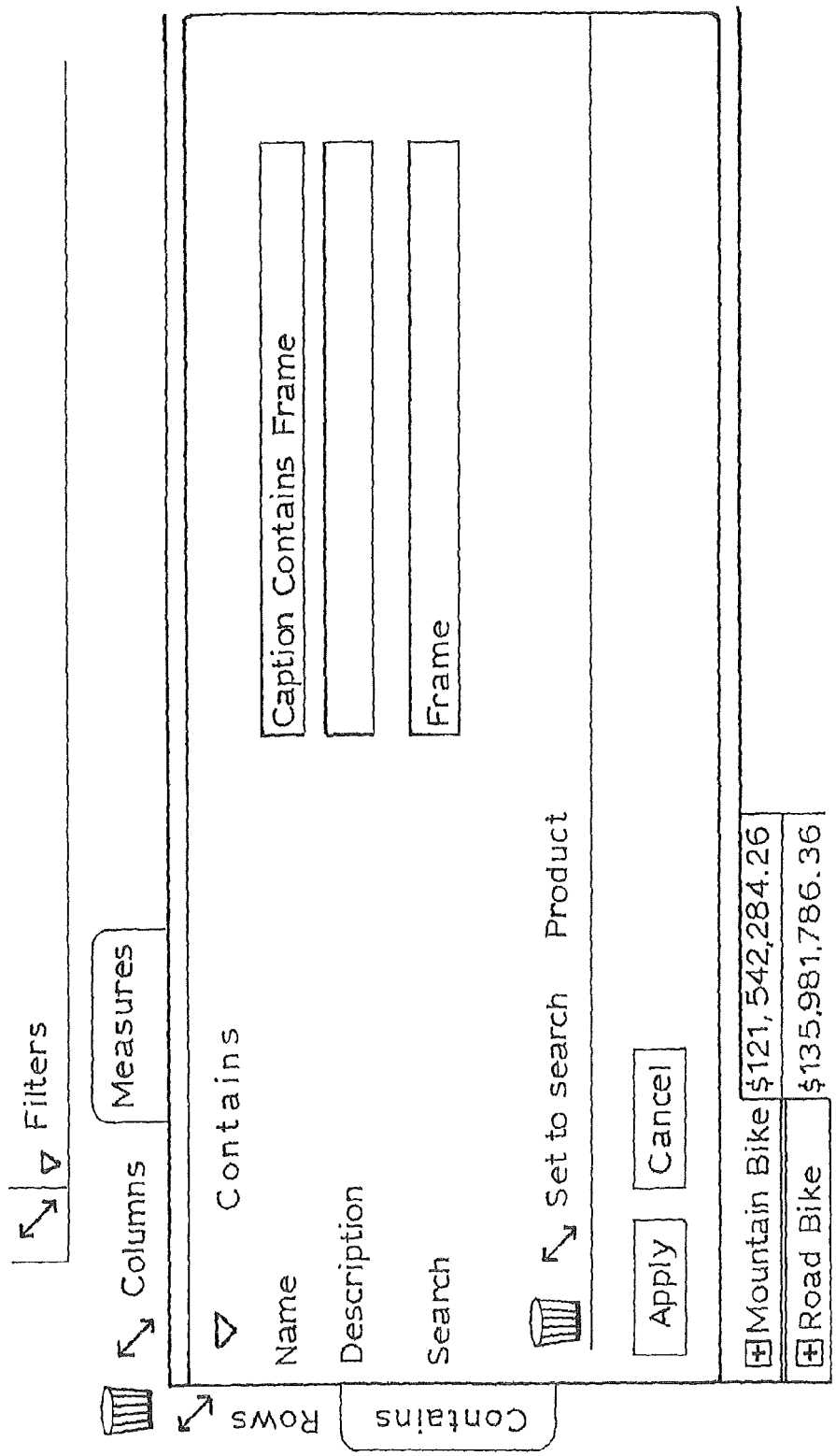
Figure 10:
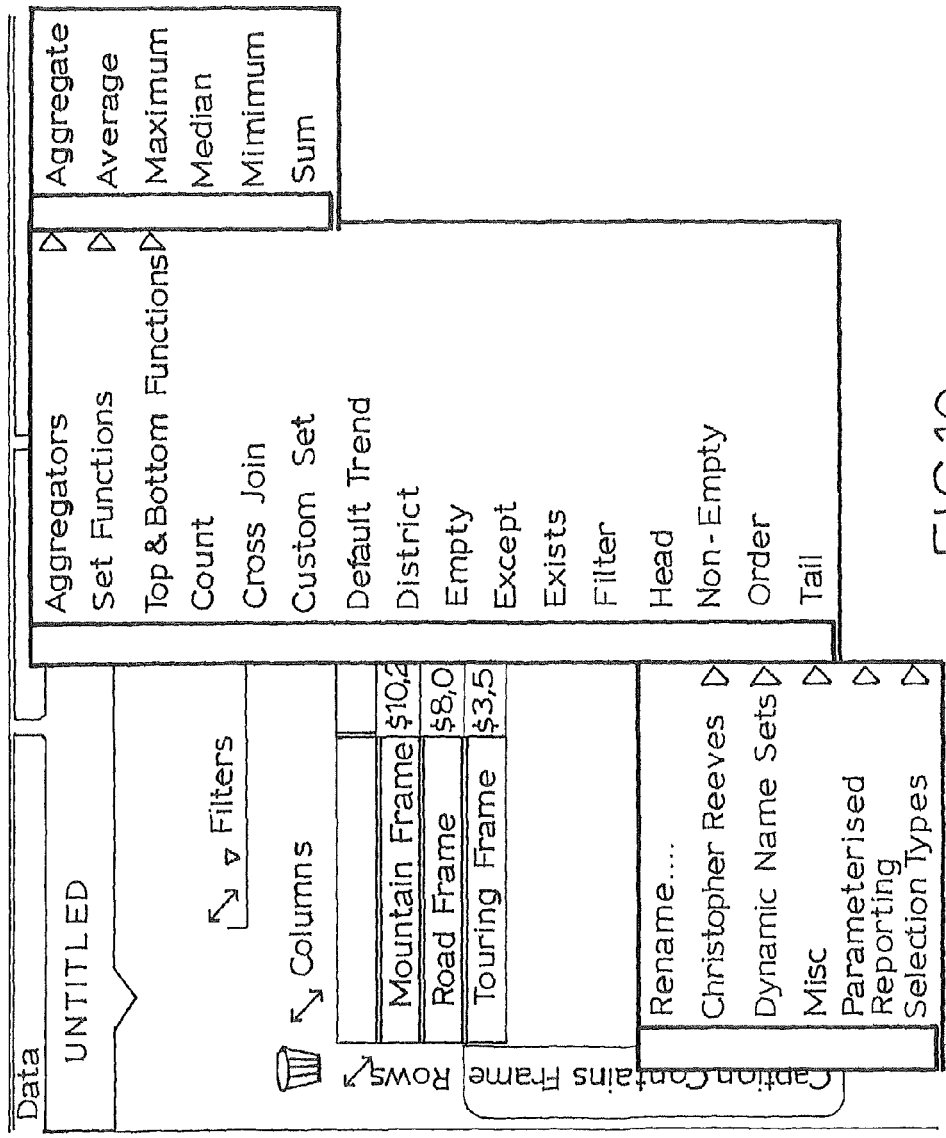

The user now clicks on the apply button and the result is shown in FIG. 8, in which the Rows axis now contains all members with the text "Frame" in their caption. In FIG. 9 is another possible design for the contains expression template resource. The user then selects the Aggregate template from the context menu shown in FIG. 10.

Figure 11:
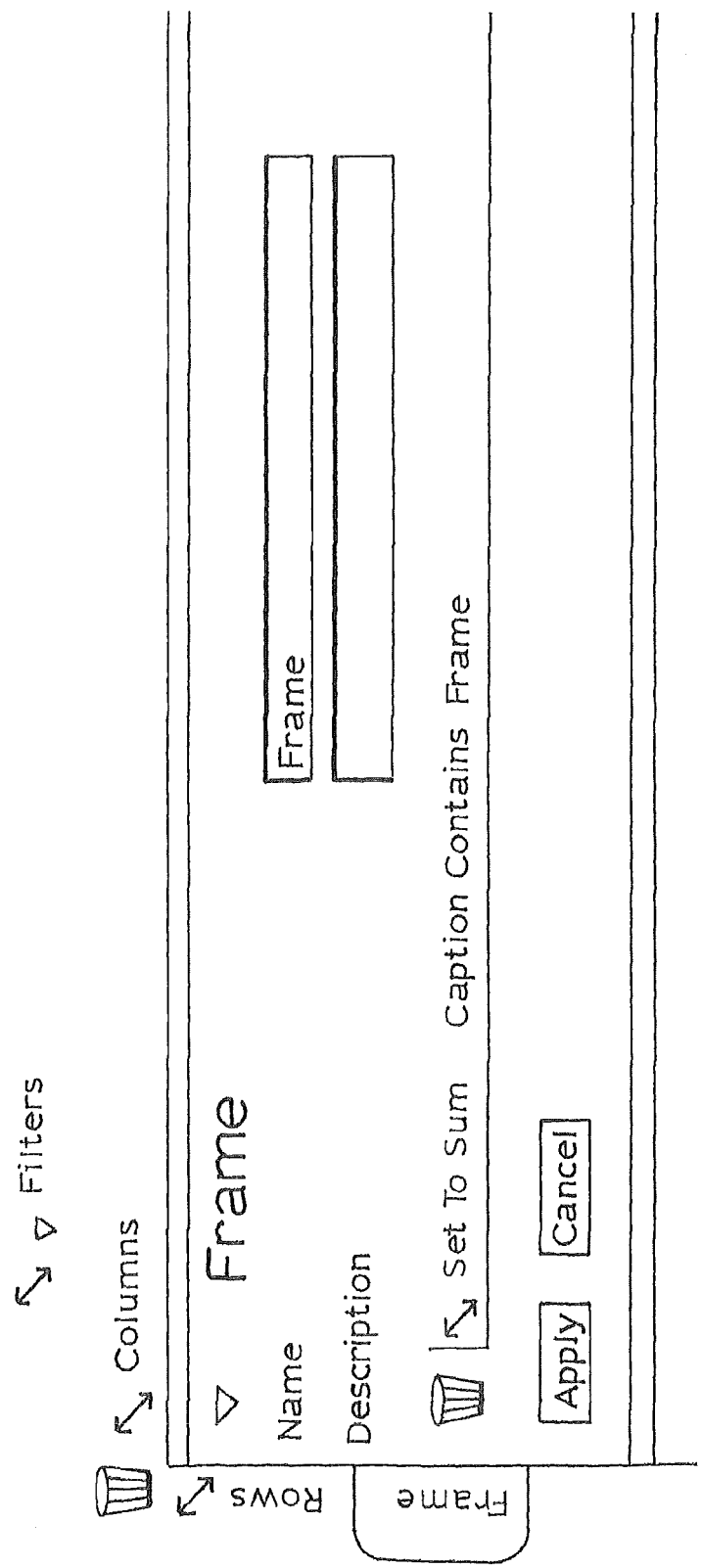

The aggregate of a set is a scalar, however this can be implicitly converted (or boxed in developer parlance) to a set. FIG. 11 shows the automatically-generated form for this template, again with the default field taken as the context query part.

Figure 12:
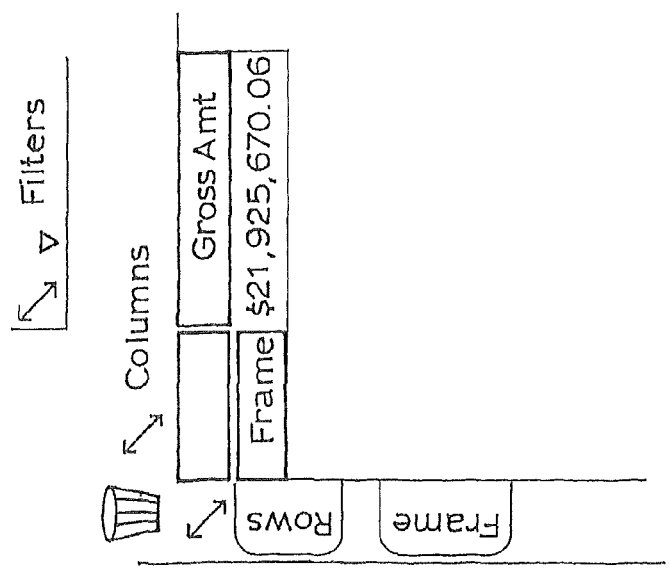

The user clicks apply and the result is FIG. 12.

Figure 13:
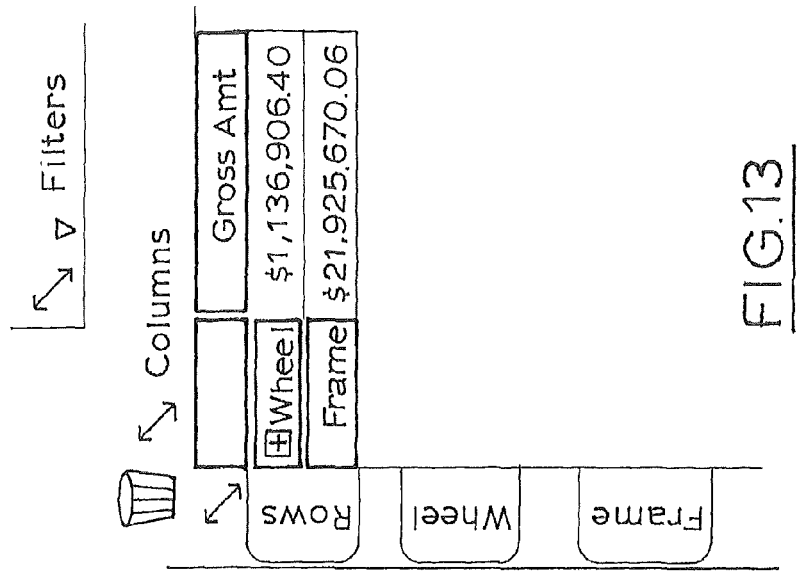

The last step is simply to drag the Wheel member onto Rows, as shown in FIG. 13.

It is noteworthy that Wheel and the calculated Frame member were automatically unioned. An enabling component to expression templates is that set lists (for example axes) will union for query parts of the same parent hierarchy and be cross-joined at hierarchy boundaries. This is explained in more depth under the technical description of this document.

Mechanics of Query Creation

Query Parts

At the core of this system is a relatively simple process: text substitution. A complex expression is written by an MDX expert, but certain markers are placed in the text of the expression to indicate that they should be replaced by the appropriate elements when available. These are placeholders and in effect the parameters of a function. This is the current state of the art.

However this is not a powerful solution in its own right. There are many constraints on what values can be passed through as parameters. Hand in hand with this system must be a rigorous constraint and type checking system. The current invention builds a static class library on top of this basic text substitution process. This results in an advanced and extensible type system.

It is worth emphasizing that fundamental to the system are 'query blocks' or 'query parts' that act like Lego™ pieces: blocks that can be assembled and re-used to create a complex whole. The type system itself provides some of these parts, for example a single measure. A business intelligence or domain expert can create a more complex and parameterised query block—an expression template that is deployed as content. Importantly, this system does not require any programming. An example of such a query block might be the aggregate of a set of members. Finally, a more complex query block (a composite template), can be created by a business user combining simpler query blocks (expression templates) together.

Query Trees

In the process of compiling a language, the source text must be transformed into a form a computer can understand. This process typically involves splitting the text into tokens via lexical analysis and then parsing it into an abstract syntax tree. For example, consider the following mathematical expression:

$$\frac{5 \times (6 + 7)}{2}$$

The syntax tree for this might look something like that shown in FIG. 34.

An enabling concept of this invention is the fact that complex multidimensional queries can be interpreted as trees of atomic sub-expressions that are combined in a parse-tree-like structure to form the overall query. Each of these sub trees is actually valid in isolation when provided with the proper context.

This is significant because the standard method of text substitution for parameterised queries can only replace leaf nodes, whereas the approach of the present invention allows any operator or sub-tree to be replaced. By analogy, if the above example were a calculator, the invention allows us to deploy a new button, "^" (an exponent operator) as content, even though that capability did not exist at the time the calculator was released to market.

Nested Substitutions

A corollary of this is that any templating solution to multidimensional queries must in turn ensure that the templates are composable. That is, they each form a building block that can be incorporated into another more complex expression. This more complex expression can, in turn, be used as part of another yet more complex expression, all the while hiding the internal details of the building blocks from the user.

The invention extends an application by adding an intuitive interface that allows the user to work with these more complex nested queries. This interface works identically when dealing with a single block.

Most modern applications must consider internationalization. Due to the innovative nature of this invention's design, a new approach is required for this requirement also. It is not feasible to maintain language-specific copies of each query block. Furthermore, this would introduce a burdensome amount of synchronisation when the query definition changes, but not the localizable text.

Included in this invention is the idea that, for each string in a resource (for example a composite template), all required translations are maintained. Consider resource names and descriptions: Initially the query block will hold text for only the language in which it was created. If a designer now views this resource in a different language, the initial values entered will still show. However any updates will only affect the view for that language. For example, changing the title from, "Total Sales" to its French equivalent would not affect the original language. From this it can be seen that resources are localizable.

This approach to localization is envisaged for all resources in a content-extensible BI application. In addition to maintainability, all users access the same content, simplifying content management.

Query Creation Process
Type System and Semantic Layer
Type Overview

Figure 14:
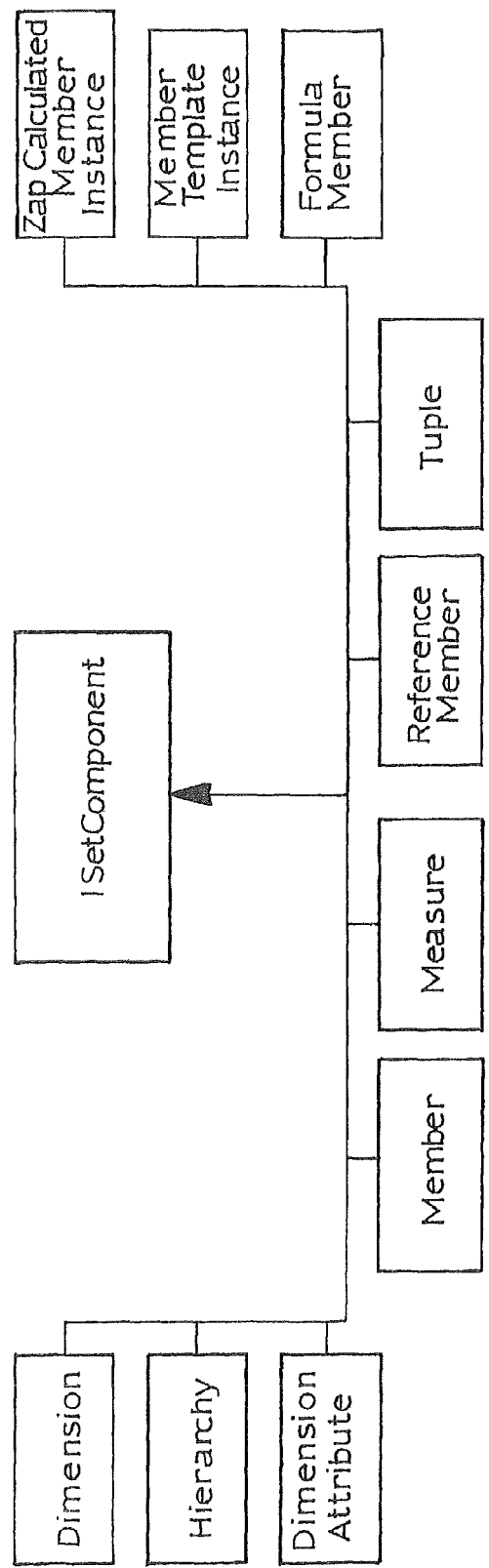
FIGS. 14 to 18 illustrate modelling with sets and set components according to this invention.
Figure 15:
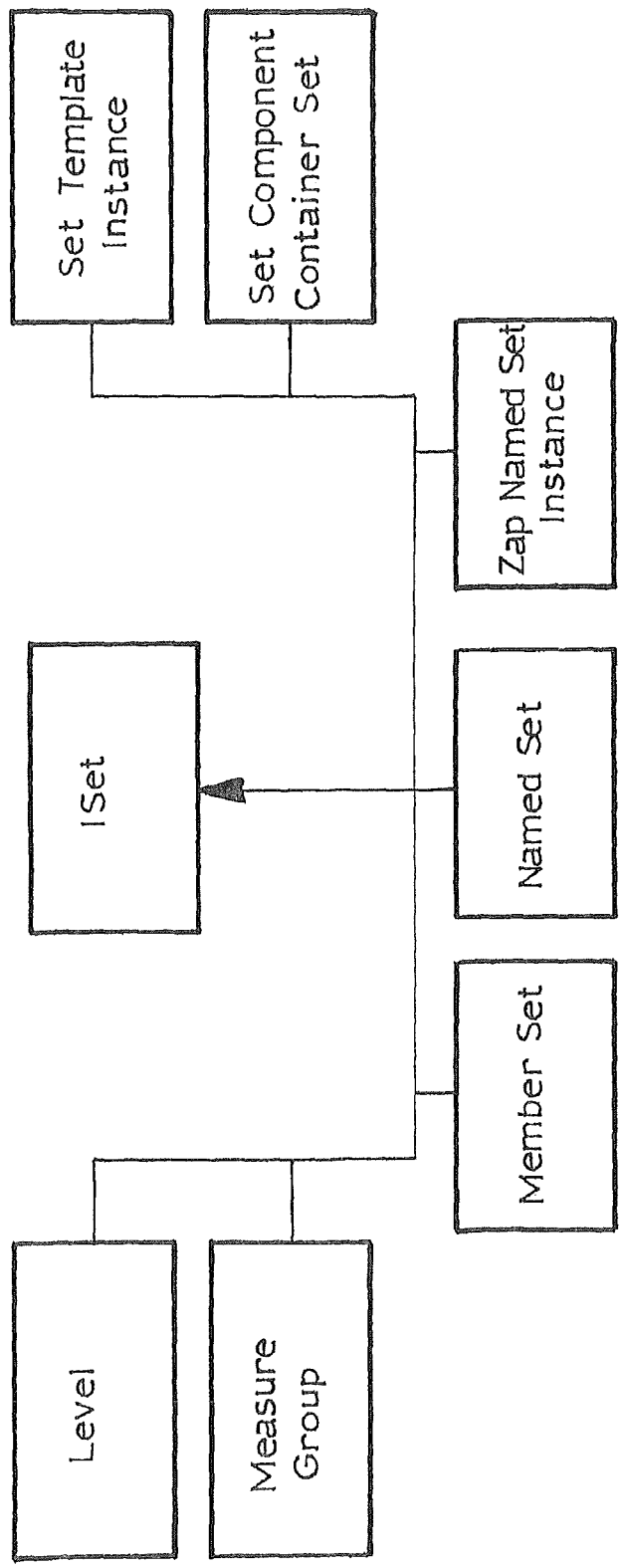

The classes of objects available to the query tree are specified in a class library. The two most important types of object are sets and the components that compose sets. One approach to modelling this with class interfaces is shown in FIG. 14 and FIG. 15. Such modelling, with the exception of Member Template Instance and Set Template Instance is the current state of the art.

It is of value to note that Patent 20070078823 takes the approach of extending this class library with metadata classes generated from expressions. This does not provide for content-based application extensibility.

Figure 16:
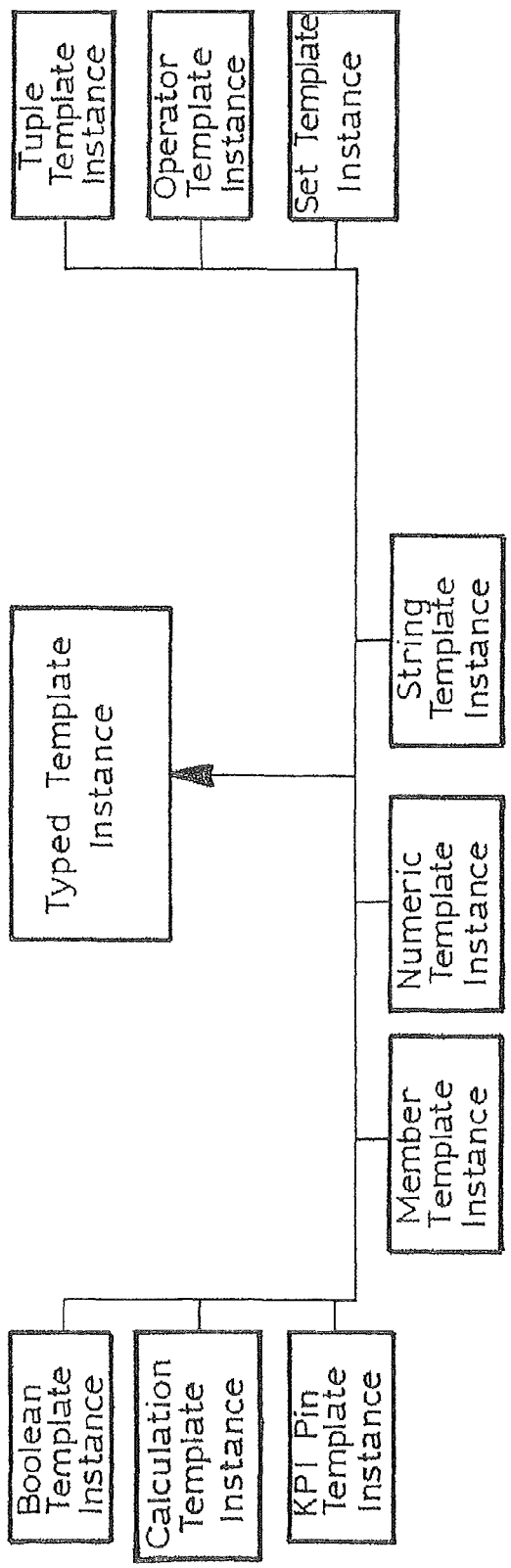
Figure 17:
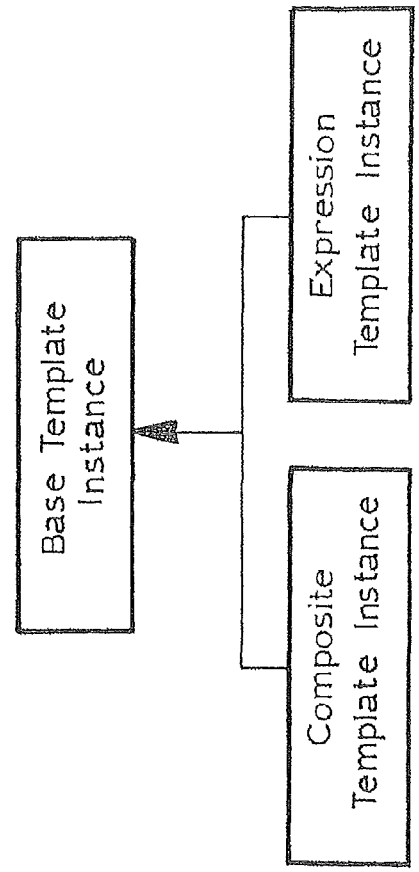

The invention in this document extends beyond the status quo and takes a different, more powerful approach, with the set of classes in FIG. 16. Template instance classes inherit from the base Typed Template Instance, which holds a reference to the expression template resource and a dictionary of key-value pairs. These keys correlate with the expression template keys and the values they represent in the user input as in FIG. 17. As such, this is an 'instance' of the template resource. The expression template itself (as content) holds the substitutable text, among other information. At query generation time, the application takes a snapshot of all substitutable text, then performs a text search and replace, matching key strings with text representations of their corresponding values. Note that the type and semantic checks were performed at design time and are not revalidated at generation time Template instance subclassing enables type system enforcement. For example, the Set Template Instance can't be placed in a Boolean field. A simplified implementation might choose to omit this subclassing step and instead have Typed Template Instance implement the necessary interfaces, for example ISetComponent and ISet.

Template Instance Subclasses
Member, Tuple and Set Templates

Member, tuple and set templates provide for template types that map to the fundamental OLAP types. A member template must return an actual member in its cube context, for the purposes of such operations as 'children of', 'siblings', etc. Set templates sensibly return sets and, together with numeric templates, solve the great majority of reporting problems.

String Templates

In order to strictly enforce the type system, numeric templates should not return strings, and such a result would be prevented by the query builder upon execution against the cube. For this reason, a specific string template instance is required. An example of its usage might be to return the string "Big number" for values over a million.

KPI Pin Templates

A side-benefit of expression templates as content is the economic benefit they provide in accelerating product development. Because they provide a means of auto-generating a form, reusing the architecture where possible is a boon, even for classic development. For this reason, KPI pin templates are useful. The required input fields are envisaged to be the pin type, for example actual versus target, and a checkbox for "Show Previous".

Boolean and Numeric Templates

Boolean and numeric templates quite sensibly return Boolean and numeric data. They combine powerfully with operator templates, below.

Operator Templates

Operator templates are so named for consistency, but do not in fact accept parameters. They simply hold snippets of multidimensional query expressions, importantly not whole expressions in their own right. This raw expression syntax is not interpreted, but rather injected directly into the final query text. They are often, but not exclusively, used for operators, for example +, −, ×, and ÷. And their real flexibility is best demonstrated by the following complement of five, that wrap a case statement.

If

<SelectExpression>CASE WHEN</SelectExpression>

Then

<SelectExpression>THEN</SelectExpression>

Else

<SelectExpression>ELSE</SelectExpression>

Else if

<SelectExpression>WHEN</SelectExpression>

End if

<SelectExpression>WHEN</SelectExpression>

Combined with Boolean and numeric templates, the envisaged BI application is now completely extensible for all formulaic requirements.

Command Templates

Importantly, the current invention extends to command-style multidimensional expressions. These are important in the OLAP domain for tasks such as write-back. A particular write-back command might require a formula to specify the allocation of a new data entry. A command template is envisaged for such purposes and can make use of all expression templates and query parts discussed here that are not query-specific, with operator templates a likely inclusion in any formula.

Calculation Templates

Cell calculations provide a means of layering calculations on top of a query result. For example the first pass of a query might result in dollar values and a cell calculation can subsequently convert this to year-on-year gain by overlaying a current year on previous calculation. A second pass might round these percentage values and so on. To an expert in the domain the applicability of content expression templates should be immediately obvious and the BI application envisaged includes such capabilities.

Type Casting

Explicit casting, although not inherent, could be implemented with templates, for example a numeric template that accepts a Boolean input and returns 0 for false and 1 for true. The type system does provide some implicit casting capabilities. A simple example of this is the way member and tuple types can implicitly be converted to numeric, by calculating their values in the cube, all other dimensions being constant.

Figure 18:
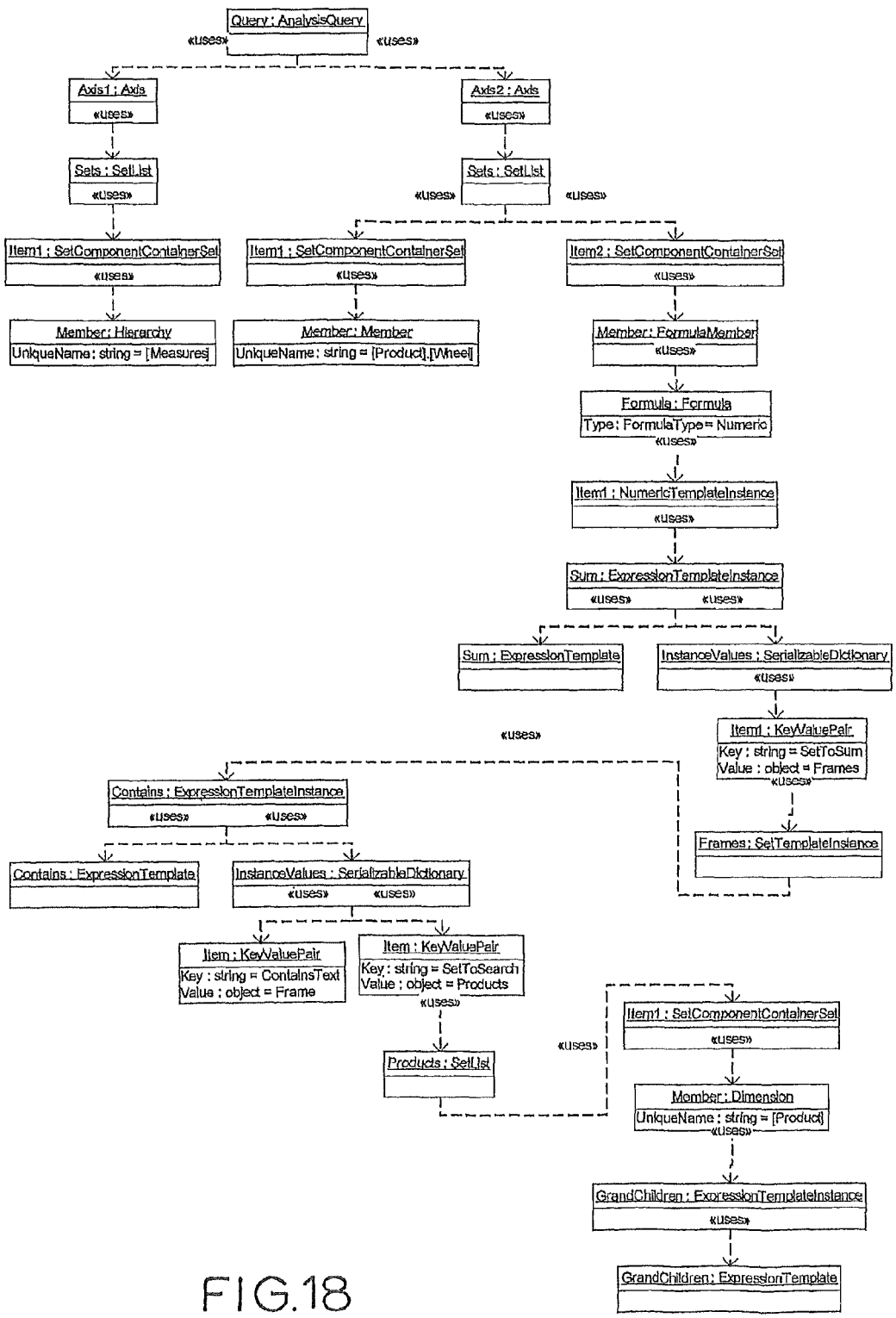

There are two interesting examples, of implicit casts that will result in boxing: they are numeric-to-set and member-to-set. Both will be demonstrated in the Worked Example Instance Diagram section. The member-to-set cast is enabled by the SetComponentContainerSet class, that implements ISet and also holds a reference to an ISetComponent. Essentially a 'mock' set object holds the member. The numeric-to-set cast also uses SetComponentContainerSet, but the numeric value must first be placed in a formula, which is held by a FormulaMember class. FormulaMember implements ISetComponent and, in addition to this, it holds a reference to a formula. FIG. 18 shows an example of this.

Worked Example Instance Diagram

FIG. 18 is an instance diagram for the end result of the worked example above. There are a few points of interest, first being that the measures hierarchy is boxed in a SetComponentContainerSet in order for it to be placed on Axis1. This is because the Hierarchy class implements ISetComponent rather than ISet. A second example of boxing can be seen: the NumericTemplateInstance is placed in a Formula object and in turn in a FormulaMember object, before also being placed in a SetComponentContainerSet. Other examples of boxing exist in the diagram. There are two template instances in FIG. 18, SetTemplateInstance and NumericTemplateInstance. Although the previous discussion indicated that the TypeTemplateInstance class held a direct reference to the template resource, FIG. 17 and FIG. 18 together demonstrate an alternative, in which the template TypedTemplateInstance object holds a reference to either a CompositeTemplateInstance or an ExpressionTemplateInstance. This extends the class library to handle composite templates, to be discussed later.

Each of the template instances identified hold a dictionary of key-value pairs. A value may in turn be another template instance, as in the case of the Frame SetTemplateInstance being nested inside Sum, demonstrating composability. A final point to note in FIG. 18 is that the Product Dimension instance holds a reference to the Grand Children expression template resource (again through the ExpressionTemplateInstance class). This is an example of a reference template, to be discussed below.

Satisfying the Type System, After the Fact

A key innovation enabling the context-sensitivity of query-building operations is the 'query part wrapper'. For example, when building a report where you wish to use the average of a set as a scalar numeric input to another template, only the set is available to use as an input parameter. Ordinarily, the type system would prevent you from dropping a set into that placeholder, as a set cannot be cast to numeric input. However, we want to delay this check until we've had a chance to wrap this set in the average operation. The average operation will return a numeric output which will form a valid input.

Query part wrappers work by acting as query part 'chameleons'. The QueryPartWrapper class implements all possible interfaces and as such satisfies all possible type restrictions. At the same time it holds a reference to (wraps) the operational query part. In this way, the user is provided with the opportunity to put their query part in place and then satisfy the type requirements subsequent to this. This can be viewed as temporally decoupling the type casting.

Reference Types

In order to satisfy all multidimensional querying requirements, it is on occasion necessary for one query part to operate on another that is not positioned logically below it on the query tree. Usually, the reference is to a query part in a parallel branch. This can be demonstrated with a hypothetical set, in which the business user has invested a great deal of time to define. The user then requires an aggregate of this set adjacent to it in the report, i.e. in a parallel branch of the tree. This requirement is satisfied with a reference to the original set. Importantly this frees the user from duplicating the investment in the original set.

Optimized Searching for Templates

The ability to provide expression templates as content, yet still provide the type and semantic checks of the classic development-driven approach, requires an optimal means of filtering the templates. For example, if a system contains a thousand templates, the easiest approach is to apply the type and semantic rules to each in turn. The result is a list of templates that satisfy the current context requirements. Such searching is likely to be unworkably slow and unsatisfactory, given this will be a core usability experience. The technique suggested is to encapsulate the type and semantic rules, as applied to a single expression template, in its content XML. This would be implemented as collection of properties calculated when the resource is saved. The following XML is an example of such an implementation.

```
<SingleDimensionality>false</SingleDimensionality>
<RowsColumnsOnly>false</RowsColumnsOnly>
<FilterUnsafe>true</FilterUnsafe>
<RequiresOppositeAxis>false</RequiresOppositeAxis>
<AttributeInColumn>false</AttributeInColumn>
<NumericInNumeric>true</NumericInNumeric>
<NumericInBoolean>false</NumericInBoolean>
<NumericInMember>false</NumericInMember>
<NumericInTuple>false</NumericInTuple>
<NumericInSetList>true</NumericInSetList>
<BooleanInNumeric>false</BooleanInNumeric>
<BooleanInBoolean>false</BooleanInBoolean>
<BooleanInMember>false</BooleanInMember>
<BooleanInTuple>false</BooleanInTuple>
<BooleanInSetList>false</BooleanInSetList>
<MemberInNumeric>true</MemberInNumeric>
<MemberInBoolean>true</MemberInBoolean>
```

-continued

```
<MemberInMember>false</MemberInMember>
<MemberInTuple>false</MemberInTuple>
<MemberInSetList>true</MemberInSetList>
<MemberInCalculationSetList>false</MemberInCalculationSetList>
<SetInNumeric>false</SetInNumeric>
<SetInBoolean>false</SetInBoolean>
<SetInMember>false</SetInMember>
<SetInTuple>false</SetInTuple>
<SetInSetList>false</SetInSetList>
```

The performance benefit offered by this approach is that indices can now be created over these XML properties. The simplicity of this approach can be demonstrated by considering that a set query part, being placed into a numeric field would a simply search for all templates with a SetInNumeric value of 'true'.

Query Builders

Although the template context menu is envisaged as the main means of working with templates, alternatives exist that are not filtered for type and semantics—for example the template explorer. Additionally the semantics used for filtering purposes are only partial for performance reasons. Query builders complete the picture by both performing the actual add-to-tree operation and enforcing all restrictions. The preferred embodiment is to have a class hierarchy of query builders, from the lowest level (for example composing a formula), up to query specific builders at the highest level (for example KPI and analysis creation).

Furthermore because expression templates are externalities from the perspective of the underlying query generation system, they contain unproven syntax. For this reason, any single query part proposed for addition to the query tree is first verified (executed) against the OLAP cube.

The query builders are also responsible for creating a snapshot of dimensionality for all query parts, as discussed under Encapsulating Dimensionality\Hierarchiality in the UI. This snapshot is usually, although not always, combined with the validation step. This snapshot can be refreshed by the query doctor if there are indications it is out of synchronization. Finally, the query builders are also charged with ensuring sets from the same hierarchy are placed in contiguous blocks in the placeholder, also discussed under Encapsulating Dimensionality\Hierarchiality in the UI.

Query Doctor

Quickly revisiting: the query builder classes not only enforce type and semantic restrictions, but also test query parts against the cube in order to validate them before adding. In doing so they also capture dimensionality snapshots.

The complement to this is a solution to test all pieces that already exist within the query tree. This provides diagnostic capabilities for broken queries and also the ability to update dimensionality snapshots. Errors can be introduced through references to resources that have been updated or deleted (for example an expression template has had its text corrupted), or when the structure of the underlying database has changed. These same two processes can introduce dimensionality changes, that might or might not cause errors, but nonetheless should be dealt with.

It can be very difficult to pinpoint exactly where a change has occurred. Given the tree-like structure of these queries, it is possible to iterate over every node in the tree and attempt to parse and execute it with its children in isolation. By automating this process, the application can quickly ascertain where the problem lies and suggest remedies to the user. Concurrent to this test, dimensionality snapshots are refreshed. It is also envisaged that such an approach would be used for query optimization purposes.

Where Application Functionality is Extended (Extension Points)

A preferred embodiment envisages four extension points to a business intelligence application. These are areas in the application at which a business intelligence expert can extend the out-of-the-box functionality by content-based means. Another possible embodiment might be overriding system algorithms, for example scorecard rollups and trend calculations.

Query Part Context Menu

Figure 19:
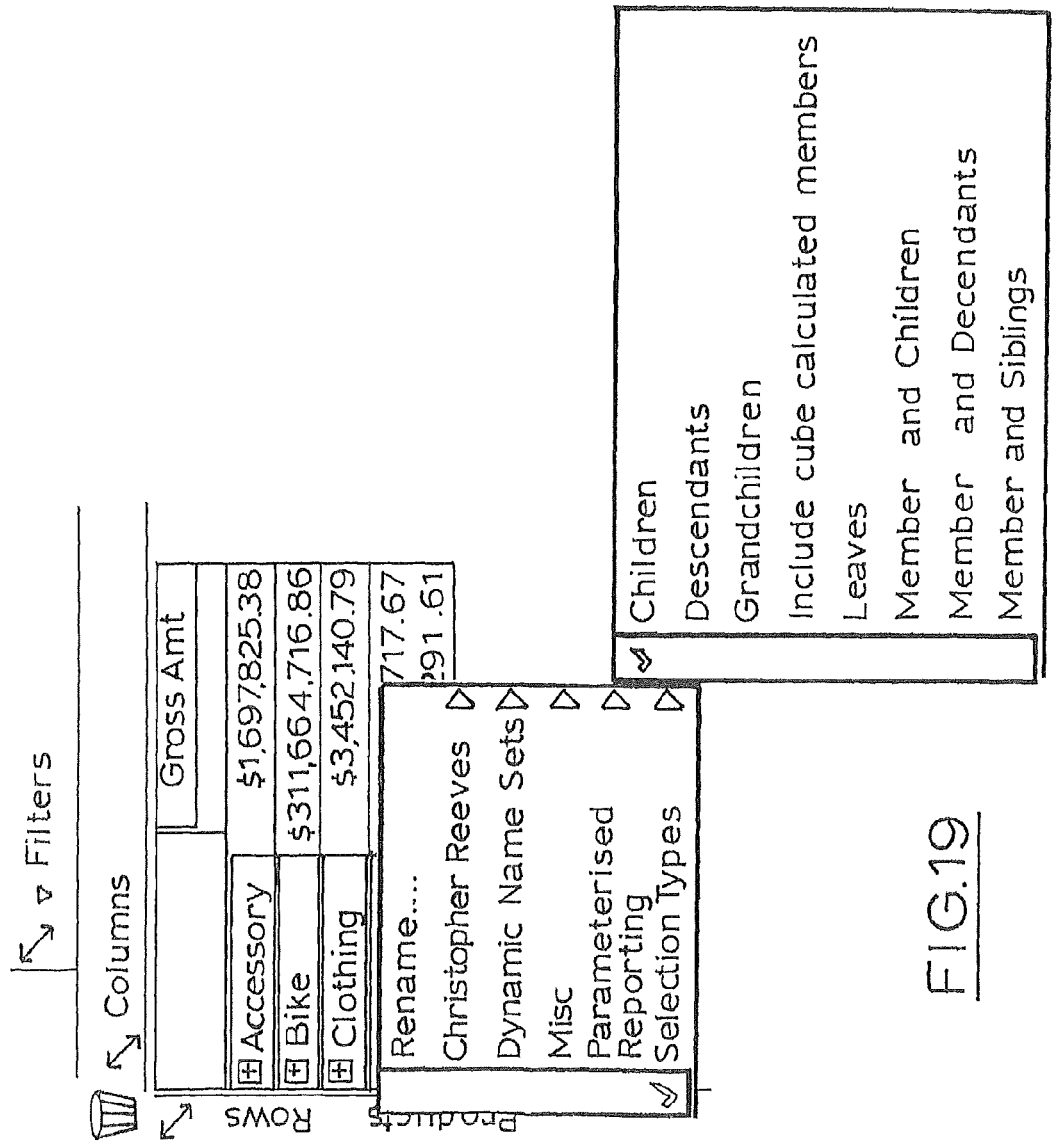
FIG. 19 illustrates a query part context menu according to one embodiment of this invention.

The most significant of these extension points is the query part context menu. Error! Reference source not found.9 shows one possible embodiment of such a menu. It is envisaged that the menu would be available both on the OLAP placeholder (Rows, Columns and Filters in FIG. 19) and in the pivot table itself. Both type and semantic filters are applied to the menu, based on cues provided by the template designer. The 'context' of the menu is both the item for which the menu is being generated (for example the Product tab in FIG. 19) and the placeholder field into which the result will be placed, The query part tab may have been dragged from one placeholder to another (for example Rows to Filters), or shown for the tab, wherever it is.

Placeholder Toolbars

Figures 20, 21:
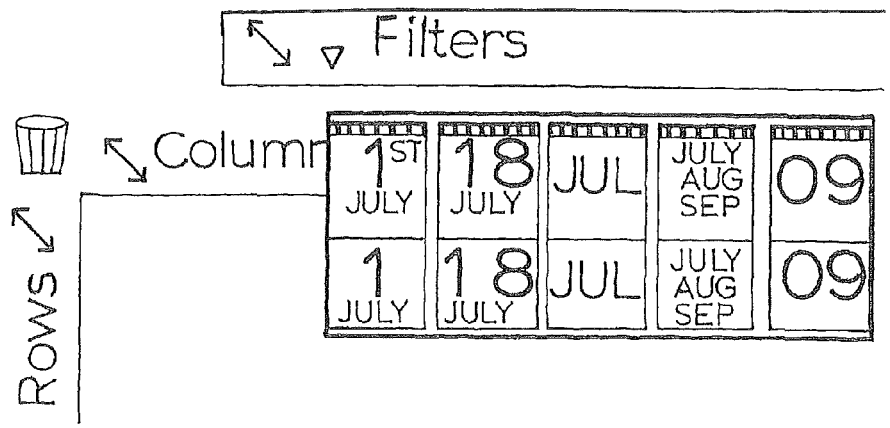
FIG. 20 shows a suite of current period templates according to one embodiment of this invention.
FIG. 21 shows an expression template explorer according to one embodiment of this invention.

Template functions are also envisaged to be available in placeholder toolbars. The designer would have the ability to specify to which placeholders the template should apply. FIG. 20 shows a suite of current period templates that have been marked as available to filter placeholders.

Expression Template Explorer

The expression template explorer (FIG. 21) provides a classic folder view of templates available as content in the application. These templates can be dragged into appropriately typed placeholders (for example Boolean template into a Boolean field). Reference templates cannot be placed directly in placeholders and are therefore unavailable from the template explorer.

Menu Extension

The application menu itself will also provide a means of accessing template functionality. The system will search for content templates that mark themselves as 'application menu visible'. The template itself provides cues as to where in the query structure it should reside. FIG. 22 demonstrates templates available in the application ribbon for the purpose of table summaries.

Template Design

Context-Naive Expression Templates

The key innovation, the content nature of the extensibility points, also implies a requirement that the content be sufficiently generic and not cube-specific. A generic Axis Average template should work for rows, columns or pages (axis 0, 1, 2 in Microsoft SQL Server Analysis Services parlance). No content should risk a unique name conflict with existing components of the queried OLAP cube. An expression template should not assume the hierarchiality of a input parameter, usually this occurs when an input is combined (cross-joined or included in a tuple) with measures in order to create the result as a calculated member in the measures hierarchy. Finally, a current date template should not assume the existence of hierarchy named 'calendar'. Many more examples of this requirement on expression templates could be given. Two innovations solve much of the problem and sensible consideration by the content B I expert, the rest.

Expression Language Extensions

The first of these innovations is expression language extensions:

For the previously mentioned Axis Average template, one particular multidimensional query language, MDX, has an Axis(n) method to refer to a specific axis. However, this method does not satisfy the requirements above, as the template designer cannot in advance be aware of which axis the template will be used in. The solution to this is to provide a set of expression language extensions that are interpreted by the application before being passed onto the OLAP engine. In this case, quite possibly the interpretation might simply involve replacing the $OppositeAxis text with either Axis(0) or Axis(1). A non-comprehensive list follows for the purposes of demonstrating possible usage of expression language extensions.

$OppositeAxis

Substituted with the current tuple of the opposite axis. The following template snippet demonstrates usage in the Rank template:

```
<SelectExpression>
    Filter(@Set, NonEmpty($OppositeAxis)Count>0)
</SelectExpression>
```

$Dimensionality(<Set>)

Substituted with the first non-measure hierarchy in the provided set. For a discussion on dimensionality see Encapsulating Dimensionality\Hierarchiality in the UI. The following template snippet demonstrates usage in the Pareto template:

```
<WithExpression>
  set Top80 as TopPercent(@Set, 80, @Numeric)
  member $Dimensionality(@Set).[Bottom 20] as Sum(@Set) −
      Sum(Top80)
</With Expression>
<SelectExpression>
    Top80 + $Dimensionality(@Set).[Bottom 20]
</SelectExpression>
```

$CurrentTupleForSet

As $OppositeAxis.CurrentTuple, but for a set. The following template snippet demonstrates usage in the Rank Set template:

```
<WithExpression>
    Set [Ordered Set] as Order(@Set, @Formula, BASC)
</WithExpression>
<SelectExpression>
    Rank($CurrentTupleForSet(@Set), [Ordered Set])
</SelectExpression>
```

Uniquely Marking Query Elements

The second important means to ensure templates are sufficiently generic is to uniquely mark all the elements in the generated query string with a generated Globally Unique Identifier (GUID). This ensures a newly created calculated member, set alias, etc. does not conflict with existing cube objects. In the following example, members from the Product hierarchy are placed in a named set called "Products of Interest". Template designers cannot be aware of all possible cubes against which they will be executed and it is therefore quite possible that at some point this named set will conflict with an existing cube object.

```
With Set [Products of Interest] as { [Product].[Bike], [Product].[Car] }
Select [Products of interest] on Columns
From TestCube
```

The solution to this, as identified above, is to uniquely mark the Products of Interest set as follows. This approach applied ubiquitously ensures templates are "write once, run anywhere".

```
With Set [Products of
Interest:{9F53098A-60DA-421b-969A-1FCEF221C585}]
    as { [Products].[Bike], [Products].[Car] }
Select [Products of
Interest:{9F53098A-60DA-421b-969A-1FCEF221C585}] on Columns
From TestCube
```

Encapsulating Dimensionality\Hierarchiality in the UI

One the most arcane concepts of the BI world is dimensionality, (also hierarchiality depending on the OLAP environment). Dimensionality is the ordered list of dimensions required to uniquely identify the object. For example, January sales is likely to be of dimensionality (Time, Measures). Business intelligence experts must be aware of when dimensionality will imply a union operation and when it will imply a cross-join operation. They must also be particularly careful to match dimensionality where appropriate, for example it is not possible to union [Product].[Car] with [Calendar].[2007]. Concurrently, in order to fully empower a BI application with expression templates, it must be possible to, for example, place the sum of the top five sales next to the sum of the bottom five sales and have the results automatically unioned. Requiring that the user manually create the union would be cumbersome and unworkable.

Extending the above example: if a January member is now placed adjacent to the two sums, it is more than likely that the user requires these sums calculated for January, and not a third row of January data, see FIG. 23. This demonstrates the requirement to also automatically cross-join in some circumstances. The preferred embodiment of an extensible BI application would union all sets of equal dimensionality and cross-join them at dimensionality boundaries. As sets are added to a set list placeholder, they would be matched to ensure contiguous blocks of dimensionality. For performance reasons, a dimensionality snapshot would be taken, however the query doctor would provide the ability to recapture this snapshot. An alternative algorithm to the above would also be provided, in which all sets are unioned, except where the user explicitly inserts a boundary marker. A multiplication sign is one likely marker. Cross multiplication would occur at these marked boundaries.

Substitution Fields and Template Type

In the simplest terms, templates are text-substitutable blocks of logic, that significantly for this invention are stored as content. Therefore the most important requirement for an expression template is substitution fields. One possible designer experience is shown in FIG. 24. In this example the user is provided with the ability to specify both Select and With clauses, as required by the MDX query language, although the invention is envisaged for any such multidimensional expression language. This example uses @ symbols to prefix substitution keys. These keys will be text substituted at generation time with the corresponding generated text from the template fields (see Fields below). FIG. 25 also includes a dropdown, of current value Set. This is the template type and determines which TypedTemplateInstance class (see above) will be created at runtime for the purposes of type checks.
Properties In order to implement expression templates as content, a few additional input fields are necessary. Two essential such fields are the default field and the parent hierarchy field. These are introduced below in addition to a few others that enhance the design.
Default Field When an expression template is applied by means of the template context menu, the object acted upon, for example a set, will be placed in the default field.

Reference templates differ slightly and are discussed later.

The preferred embodiment is to show the template context menu on right-click, and this technique is used for the following example: The user places a set containing Bike and Car on the Columns axis. The user right-clicks the set, and the template context menu shows. All templates that accept a set as input and can be placed on an axis are shown. The user selects Sum and the Bike and Car set is placed in the default field of this template. For a more in depth work-through, refer to Worked Example.

From this, it can be seen the default field defines the input type of the template, while the template type (see Substitution Fields and Template Type) defines the output type. If this field is set to None, the template will not be available from the context menu.
Parent Hierarchy Field Under Encapsulating Dimensionality\Hierarchiality in the UI, the importance of dimensionality is discussed. The Parent Hierarchy field allows the template designer to specify from which field to extract dimensionality. Or, put another way, which field will provide the hierarchy to be used as the parent of the calculated member. For example, if the following MDX snippet were the result of a hypothetical 'Double It' template, the result would be infinite recursion:

With Member [Measures].[Double Bike] as [Product]
[Bike]*2

In order to prevent this, the Double Bike member should be placed in the Product hierarchy and this is enabled by the Parent Hierarchy field. In the previous MDX, if [Product].[Bike] were a substituted member field, say @Member1, that field would be selected for the Parent Hierarchy field in order to correct the issue.

It is possible to explicitly enforce the Measures hierarchy as the parent. This only applies to Numeric and Member type templates.
Format Field and Format String The Format Field allows the expression template to explicitly override the cube's inferred number format, which often fails for complex formulae. The importance of this field is best demonstrated with the Simple Moving Average template, the Select expression for which is show below:

```
<SelectExpression>
    Avg(ParallelPeriod($OppositeAxis.TimeHierarchy.Level,@Lag):
        $OppositeAxis.TimeHierarchy, @Formula)
</SelectExpression>
```

If Format Field is set to None and the template applied, the format against some OLAP systems comes back with 8 decimal places and no currency symbol. Specifying the @Formula field as the format master corrects this issue. If the @Formula field instance includes only a single measure, the format is taken from this. If the formula includes a nested numeric template, the format of this nested numeric template is taken from its format field and format string, and so on down the line in a recursive manner. A set of precedence rules apply when measures and numeric templates are applied. This solution provides a high level of control over automatic formats and is significant to the end-user getting what they need without further adjustments.

An alternative to specifying the Format Field is enforcing a particular format with the Format String property. The most important detail however is that one of these fields should be set and generally this is the Format Field. The Format Field in effect allows the template to act as a formatting conduit. In a tree of templates, any single broken pipe (an unspecified or incorrectly specified Format Field), will bring down the system. For example, if Simple Moving Average, in turn holds an instance of the Minimum template, with (hypothetically) Format Field unspecified, the format engine will step from Simple Moving Average to Minimum, but then finding no configuration, simply fall back to the cube default, which as explained is inadequate.
Reference Templates Reference templates (so named because the query part references the template rather than the opposite) must be single input templates of type member-to-member or set-to-set. In developer terms, they apply the decorator design pattern to templates, allowing new behaviour to be added at runtime. They are applied by checking (placing a tick on) the item in the context menu, as demonstrated under Worked Example. Multiple reference templates can be applied to a single query part. They have a few dependant fields, listed below:

Reference Order—If multiple reference templates are applied, this resolves the order in which they are applied to the generated expression.

Toggle Type—Specifies whether the reference template is of checkbox style or radio button style (mutually exclusive within a group).

Toggle Group Id—If a radio button-style template, provide a unique Id for the group in which its application will be mutually exclusive.

Reference templates are a user interface convenience. Any reference template could in fact be converted into non-reference template and used in the alternate, 'wrapping' manner, as in Worked Example.
Fields Fields are the substitutable elements of the template. Fields must have at least three properties: a key, a localizable name, and a field type. A fourth property, the dimension type, provides for semantic checks. FIG. 25 shows one possible design experience for an expression template field. In this example, the user is prompted for input of type set list (see Field Types), with the text "Set to Filter". The key text, @FilterSet, will then be text substituted at query generation time with a string representation of the user input.

The Dimension Type property, if specified, will restrict entries to the dimension type provided, for example Time. Furthermore if a only a single cube object of the required type, for example hierarchy, matches on this dimension type, then that object's name will appear in the field by default. A 'current period' template could make use of this capability if only one time hierarchy exists in the cube. The field properties identified represent a subset any likely implementation.
Field Types As identified above, a field type is required for all fields. The field type is the information provided to the type system to ensure a valid query structure is ultimately generated. The following snippet demonstrates a possible substitutable select statement, for the @FilterSet field in the previous section. It is important to note that the set list field type was derived from the input requirement of the MDX Filter function.

Filter(@FilterSet, Measures.DefaultMember>0)

The field type is at the discretion of the template designer, within the restrictions of the expressions themselves. For example, the Filter function in the example above would not have accepted a Boolean, however any function requiring a numeric input could use the Numeric type or the User Input type (see below).

Single Item Placeholders

Single item placeholder tabs have direct, one-to-one relationships with OLAP cube objects. They include:
Dimension
Hierarchy
Level
Measure
Dimension attribute
Measure group
Member Multiple Item Placeholder Multiple item placeholders can hold multiple tabs that are combined in the context of the placeholder type. For example multiple elements in a Numeric placeholder are combined to form a formula. They include:
  Set list—A set list placeholder accepts a list of sets. These are unioned and cross-joined as necessary to result in an aggregate set.
  Tuple—A tuple placeholder accepts multiple members, all from different hierarchies and represents a single point of data in a cube.
  Boolean—Accepts a logical formula that evaluates to either true or false.
  Numeric—Accepts a formula that evaluates to a number.
  Generated numeric—Allows a user to specify the number of numeric fields and the value for each, as for example with dial colour-coding boundaries in a KPI resource.

Control Inputs

Control input types allow the user to enter data using classic UI elements, for example check boxes. They include:
  User input
  Generated user input
  Check box
  Drop down
  Radio button The generated user input type allows the user to specify the number of input fields and the value of each. An example of its usage would be the dial colour-coding boundaries of a KPI.

Specialty
  Reference member—A drop down list of referenceable member instances in the query.
  Reference set—A drop down list of referenceable set instances in the query.
  Property—An MDX property, of input type string. This field can hold substitutable text, in the same way that With and Select fields can.
  Colour—A colour input control, for conditional formatting
  Font—A font input control, for conditional formatting Resource Properties To complete the expression template design discussion, and in the natural flow of the design process, the content is now saved. FIG. 26 provides an example Save As popup for the template resource. Importantly, the designer can provide a name and description and specify a location in which to store the content. The resource properties will include security information and common details, for example Created By, Create On, etc.

Enhanced Applications

Verticalization

The invention provides a mechanism by which business intelligence expertise can be "captured, bottled and re-sold".

The ability to nest templates means that reports can be separated from their underlying data sources and reused by introducing a mapping layer. For example, complex financial reports can be created against key measures found in all accounting systems; these key measures are created with parameter-based query parts that map the key concepts being reported against, such as "Sales", to the underlying measures in a database. This same report can then be reused on another accounting system simply by changing the mapping for "Sales" to the appropriate measure in that system. This way both the underlying reporting elements (for example a function to calculate gross profit margin) and the reports themselves can be created, shared and reused.

Furthermore, the infrastructure of the invention supports the parameterization of any or all of these reports and their components and will dynamically prompt the user with a consolidated set of inputs where required. To support the commercial realization of these vertical reporting and performance management solutions, the system also allows each report and reporting function to be licensed individually.

Fixing Drill-Through

One common difficulty in the OLAP world is drilling-through on calculated members (for this discussion, simply any row or column that is calculated, rather than data retrieved unaltered from the cube). Commonly, the OLAP cube will simply disallow such an operation. Many implementations even restrict drill-through to a single cell. The expression template architecture described in this document provides for two means of solving this perennial pain point. The first solution provides an automated means of resolving the drill-through sub-cube (filter), that is, the set of members that compose the data point(s). FIG. 27 shows a simple analysis in which January, February and March have been aggregated into the calculated member, "Jan, Feb, Mar". It is intuitive for a user that drilling-through on the single data cell should return all data entries for these three months. Quite surprisingly, even this simple operation is usually impossible.

Due to the query-tree nature of content expression templates, it is possible to traverse a formula definition to find the top level cube objects that compose it, for this example the month members. These members then define the sub-cube (filter) against which to drill-through. This solution satisfies basic requirements.

FIG. 28 demonstrates a far more complicated requirement. The calculated member on Rows is now an aggregate for all Date members, for the year-to-date. However, the expression syntax required to generate this result is intractable from the system's perspective:

```
<SelectExpression>
    Sum(PeriodsToDate(@Level, @TimeMember), @Formula)
</SelectExpression>
```

It is envisaged that expression templates have an additional substitutable field that provides the drill-through filter for that calculation. For the above expression, the equivalent drill-through expression might be:

```
<DrillThroughExpression>
    PeriodsToDate(@Level, @TimeMember)
</DrillThroughExpression>
```

Now, returning to FIG. 28, on drilling-through, the system will substitute the DrillThroughExpression field (above) in the same way as discussed previously, in order to provide an expression that returns the period-to-date members. This set is then used as the drill-through sub-cube. Combining the two techniques proposed here, an expert in the field could deduce that a genuine solution for drilling-through on calculated members has been provided by the application proposed.

Composite Templates

Whereas expression templates can be considered 'elemental' in nature, composite templates allow end-users, importantly without business intelligence expertise, to 'compose' expression templates into large blocks of logic. For example, the worked example above calculated the sum over a filtered set. If it were determined that this is a sufficiently common requirement, a "Filtered Sum" template might be created. While both the Sum and Contains expression templates required knowledge of the underlying query language, the creation of this new composite template would not. Therefore composite templates lower the entry barrier and effectively open up template creation to all BI application users. FIG. 29 shows one possible design experience for a composite template. In this example the type of the composite template is selected with a dropdown. This selection in turn affects the placeholder below it, which becomes a set list placeholder. The user is then able to drag the templates that will compose the composite template from the template explorer. Note composite templates can contain other composite templates, so that the designer can build larger and larger logic blocks.

OLAP Stored Procedures

The programming language field can be loosely divided into declarative and imperative. Declarative programming states the logic without being explicit on the flow, while imperative programming explicitly states the flow. Traditional OLAP query languages, being declarative, have not had the capability to iteratively process data during execution. The addition of stored procedures to certain OLAP databases has complemented and enriched their problem-solving capabilities. Another aspect of the invention is the ability to write complex, custom stored procedures and distribute them with all the benefits implied by the content-based extensibility approach. Ultimately the procedures are deployed to an OLAP database. These procedures are then available in addition to the native functions offered by the database vendor in the query language. The innovation here applies to the content-based method by which these store procedures are distributed and deployed. Stored procedures within an application envisaged by this patent would be stored as resources. These resources could be copied and pasted within the application and distributed externally.

FIG. 30 depicts one embodiment of the design experience for such a resource. In this non-specific example, the assembly Zap.BI.AnalysisServices includes customizations in the form of stored procedures. The deploy and remove buttons enable a user with sufficient rights to deploy these customizations to their local cube. This resource can be exported to any compatible system.

An expression template resource is necessary to expose this new cube customization, hence the innovation of content based. OLAP stored procedures builds on content based expression templates. The core expression of such a template might be:

```
[System Extensions].GetColor(@FromColor,
    @ToColor, @Minimum, @Maximum, Measures.CurrentMember, @Logarithmic)
```

The end result might be a calculation template instance to create a heat map from an analysis, as shown in FIG. 31. From this, an expert-in-the-art reader should be able to conclude that the content stored procedures component of this invention provides a means, based on imperative programming, of extending a business intelligence application and providing this new functionality to non-experts in the domain.

Expert System Design and Delivery

Expert systems are a class of computer program that can advise, analyse, categorize, communicate, consult, design, diagnose, explain, explore, forecast, form concepts, identify, interpret, justify, learn, manage, monitor, plan, present, retrieve, schedule, test, and tutor. They address problems normally thought to require human specialists for their solution.

Meta-Wizard Framework

Building on all the pieces outlined so far, we now extend the invention framework to include process workflow. Many complex tasks, such as forecasting, require an in-depth knowledge of statistical methods. Furthermore, there may be accepted industry conventions and approaches for solving common business problems.

The system allows for the creation of Meta-Wizards. These are workflows that guide a user through a complex analytical task. A designer tool is provided to specify each dialog in the wizard, and any existing algorithmic content can be included and is abstracted from cube specifics using the techniques discussed above.

For example, consider linear regression. Finding a line of best fit is relatively straightforward with most applications. However, the reliability of this estimate is often doubtful without a thorough examination of the underlying data and a testing of all the assumptions involved. FIG. 32 is an example of a workflow that could be created to address this problem. Each box in the flow chart represents a dialog box designed to guide the user through that stage of the process. The algorithms for each of these tests would need to be made available through content as described above.

Workflow Specification

Once the steps for the Meta-Wizard have been defined, a workflow can be overlayed to define the order and conditions required to proceed from one step to the next. This is important because the sequence of steps is often crucial—for example, the diagnostic and remedial steps required to create a valid linear regression model are outlined in the flow chart shown in FIG. 32.

FIG. 32 is an example of the sort of workflow that would be created when developing a wizard.

Dialog Design for Each Wizard Stage or Step

In User Interface (UI) design, a 'wizard' is a series of dialog boxes that step the user through a process workflow in the correct sequence. In a preferred embodiment, each of these dialogs is created using the standard dashboard capabilities of the BI application. Data can be presented to the user by embedding reports in a dialog with which they can interact in the usual way, as well as a collection of prompting mechanisms, similar to those in the template instance editors, for collecting user input.

There are standard UI options based on the data type for the information being collected. For example, displaying a drop down for choosing a categorical setting. In the example presented below, the user is guided through the creation of a logistic regression model to predict the probability of 'customer turn'. The amount of information each candidate variable provides about the quantity we are trying to predict (customer turn) is presented visually as a bar chart as seen in FIG. 33. The user can then use this in combination with some 'quality-of-fit' summary statistics to select the appropriate subset of variables.

Conclusion

The present invention provides a framework for complex querying and analysis of multidimensional databases that:

Requires no knowledge of query languages on the part of end-users.
  Allows business intelligence and domain experts to develop reusable query 'building blocks'.
  Allows business users to build and develop sophisticated queries quickly and easily using these 'building blocks'.
  Allows business users to build more complex 'building blocks' as the composite of individual 'building blocks'.
  From the business user's perspective, transparently combines declarative querying capability with iterative processing of data
  Delivers all user-created queries and capabilities as reusable content
  Is pervasive within the application, extending to KPI queries, drill-through queries, dashboard filters, scorecard rollup algorithms, and literally any point at which an expression is required and might benefit from templating.

From the above it can be seen that this invention provides a unique BI system that eliminates the need for specialist assistance beyond the initial implementation.

Those skilled in the art will appreciate that this invention provides an infrastructure that simultaneously hides away the complexity of OLAP reporting, empowers the user to perform complex analyses, and delivers a dynamically extensible system that allows users to capture commonly used reporting constructs manage key business processes and workflows, and reuse and administer them.

Those skilled in the art will also realise that this invention may be implemented in embodiments other than those described without departing from the core teachings of this invention.

The invention claimed is:

1. A computer readable storage medium including executable instructions as part of a business intelligence query system which includes the capability to iteratively process data during execution, wherein
  complex multidimensional queries are interpreted as trees of atomic sub-expressions that are combined in a parse-tree-like structure to form the overall query wherein each sub tree is valid in isolation when provided with the proper context;
  wherein each sub tree is stored in the application content; and
  some subtrees are expression templates and the type and semantic rules, as applied to a single expression template, are held as content.

2. A computer readable storage medium including executable instructions as claimed in claim 1 in which the type and semantic checks are performed at design time and are not revalidated at generation time.

3. A computer readable storage medium including executable instructions as claimed in claim 1 wherein additional input fields are used including a default field and a parent hierarchy field.

4. A computer readable storage medium including executable instructions as claimed in claim 1 which includes a context menu available for query parts which displays the applicable expression templates and employs a type system and semantic logic to filter available expression templates.

5. A computer readable storage medium including executable instructions as claimed in claim 1, which includes a drill through-on-calculated-members solution, at the application level, that allows the template designer to specify a substitutable drill through set expression.

6. A computer readable storage medium including executable instructions as claimed in claim 1, which marks all aliased elements, within a generated query, with a globally unique identifier to the end of generalising context expression templates to be substantially cube and context agnostic.

7. A computer readable storage medium including executable instructions as claimed in claim 1, which uses the parse-tree-like structure to recursively execute components to determine context expression templates that have introduced errors or performance issues.

8. A computer readable storage medium including executable instructions as claimed in claim 1, which provides multidimensional expression extensions that are substituted at generation time to generalise context expression templates sufficiently to be cube and context agnostic.

9. A computer readable storage medium including executable instructions as claimed in claim 1, wherein reporting content and reporting functions are reusable.

10. A computer readable storage medium including executable instructions as claimed in claim 1, which uses four resource types saved as content wherein the resource types are multidimensional expression templates, OLAP database stored procedures, composite templates and data-mining algorithms and workflow.

11. A computer readable storage medium including executable instructions as part of a business intelligence query system which includes the capability to iteratively process data during execution, wherein
  complex multidimensional queries are interpreted as trees of atomic sub-expressions that are combined in a parse-tree-like structure to form the overall query wherein each sub tree is valid in isolation when provided with the proper context;
  wherein each sub tree is stored in the application content; and
  some subtrees are expression templates which at generation time use simple text substitution with instance specific parameters to produce multidimensional expression syntax.

12. A computer readable storage medium including executable instructions as claimed in claim 11, which exposes the content expression templates in a context menu, wherein the list of templates is filtered using a type system and semantic logic.

13. A computer readable storage medium including executable instructions as claimed in claim 11 wherein additional input fields are used including a default field and a parent hierarchy field.

14. A computer readable storage medium including executable instructions as claimed in claim 11, which includes a drill through-on-calculated-members solution ,at the application level, that allows the template designer to specify a substitutable drill through set expression.

15. A computer readable storage medium including executable instructions as claimed in claim 11, which marks all aliased elements, within a generated query, with a globally unique identifier to the end of generalising context expression templates to be substantially cube and context agnostic.

16. A computer readable storage medium including executable instructions as claimed in claim 11, which uses the parse-tree-like structure to recursively execute components to determine context expression templates that have introduced errors or performance issues.

17. A computer readable storage medium including executable instructions as claimed in claim 11, which provides multidimensional expression extensions that are substituted at generation time to generalise context expression templates sufficiently to be cube and context agnostic.

18. A computer readable storage medium including executable instructions as claimed in claim 11, wherein reporting content and reporting functions are reusable.

19. A computer readable storage medium including executable instructions as claimed in claim 11, which uses four resource types saved as content wherein the resource types are multidimensional expression templates, OLAP database stored procedures, composite templates and data-mining algorithms and workflow.

* * * * *